United States Patent
Conklin et al.

(10) Patent No.: US 11,949,951 B2
(45) Date of Patent: *Apr. 2, 2024

(54) METHODS AND APPARATUS TO CLASSIFY ALL OTHER TUNING DATA

(71) Applicant: THE NIELSEN COMPANY (US), LLC, New York, NY (US)

(72) Inventors: Charles C. Conklin, New Port Richey, FL (US); Michael Lombardi, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,779

(22) Filed: Aug. 26, 2022

(65) Prior Publication Data

US 2022/0417596 A1    Dec. 29, 2022

Related U.S. Application Data

(63) Continuation of application No. 16/528,156, filed on Jul. 31, 2019, now Pat. No. 11,432,042.

(51) Int. Cl.
*H04N 21/442* (2011.01)
*G06F 16/73* (2019.01)
*H04N 21/422* (2011.01)

(52) U.S. Cl.
CPC ....... *H04N 21/44222* (2013.01); *G06F 16/73* (2019.01); *H04N 21/422* (2013.01); *H04N 21/44218* (2013.01)

(58) Field of Classification Search
None
See application file for complete search history.

(56) References Cited

U.S. PATENT DOCUMENTS

| | | |
|---|---|---|
| 5,481,294 A | 1/1996 | Thomas et al. |
| 7,882,514 B2 | 2/2011 | Nielsen et al. |
| | (Continued) | |

FOREIGN PATENT DOCUMENTS

| | | |
|---|---|---|
| CN | 114402625 A | 4/2022 |
| EP | 3010167 A1 | 4/2016 |
| KR | 20150111760 A | 10/2015 |
| WO | 2021021954 A1 | 2/2021 |

OTHER PUBLICATIONS

International Searching Authority, "International Search Report and Written Opinion," issued in connection with PCT patent application No. PCT/US2020/044103, dated Oct. 30, 2020, 10 pages.

(Continued)

*Primary Examiner* — Jason K Lin

(57) ABSTRACT

An example apparatus includes a record updater to initialize a variable to be equal to a first time of a first record classified as AOT data or to be equal to a last time of a last record classified as AOT data, an operating state identifier to access a first channel of the first record and last channel of the last record, a comparator to compare the first channel with a second channel or a third channel with the last channel, the second channel corresponds to a previously classified record of the first record and the third channel corresponds to a previously classified record of the last record, and a duplicator to, in response to the first channel matching the second channel, or the last channel matching the third channel, create a replica of the second channel or the third channel to store in place of the AOT data.

20 Claims, 14 Drawing Sheets

(56) References Cited

U.S. PATENT DOCUMENTS

| | | | |
|---|---|---|---|
| 9,124,853 | B2 | 9/2015 | Vanderhoff et al. |
| 9,681,179 | B2 | 6/2017 | Stokes et al. |
| 11,432,042 | B2 | 8/2022 | Conklin et al. |
| 2004/0133906 | A1 | 7/2004 | Przybylek |
| 2007/0050832 | A1* | 3/2007 | Wright .................. H04H 60/56 725/115 |
| 2008/0126420 | A1 | 5/2008 | Wright et al. |
| 2008/0250445 | A1 | 10/2008 | Zigmond et al. |
| 2010/0115543 | A1 | 5/2010 | Falcon |
| 2011/0088052 | A1* | 4/2011 | Ramaswamy ..... H04N 7/17309 725/16 |
| 2011/0292284 | A1 | 12/2011 | Lee et al. |
| 2013/0247081 | A1 | 9/2013 | Vinson et al. |
| 2014/0380348 | A1 | 12/2014 | Shankar et al. |
| 2015/0288513 | A1 | 10/2015 | Nelson |
| 2016/0119672 | A1* | 4/2016 | Alonso .............. H04N 21/4728 725/19 |
| 2016/0261917 | A1 | 9/2016 | Trollope et al. |
| 2017/0289226 | A1 | 10/2017 | Deshpande et al. |
| 2017/0302997 | A1 | 10/2017 | Brown |
| 2018/0035141 | A1 | 2/2018 | Stokes et al. |
| 2018/0137349 | A1 | 5/2018 | Such et al. |
| 2018/0220168 | A1 | 8/2018 | Han |
| 2020/0366959 | A1 | 11/2020 | Pau et al. |

OTHER PUBLICATIONS

United States Patent and Trademark Office, "Non-Final Office Action," issued in connection with U.S. Appl. No. 16/528,156, dated Feb. 4, 2021, 17 Pages.

United States Patent and Trademark Office, "Final Office Action," issued in connection with U.S. Appl. No. 16/528,156, dated May 17, 2021, 20 Pages.

United States Patent and Trademark Office, "Advisory Action," issued in connection with U.S. Appl. No. 16/528,156, dated Jul. 28, 2021, 3 Pages.

International Searching Authority, "International Preliminary Report on Patentability," issued in connection with PCT No. PCT/US2014/059809, dated Feb. 1, 2022, 7 pages.

United States Patent and Trademark Office, "Notice of Allowance," issued in connection with U.S. Appl. No. 16/528,156, dated Apr. 18, 2022, 9 Pages.

Canadian Intellectual Property Office, "Examiner's Report," issued in connection with Canadian Patent Application No. 3,146,070, dated Feb. 14, 2023, 3 pages.

European Patent Office, "Extended European Search Report," issued in connection with European Patent Application No. 20847052.6, dated Aug. 2, 2023, 9 pages.

* cited by examiner

| Time: | TV On/Off: | Video Status: | Audio Status: | Volume: | Match | Major/Minor Channel | Broadcast Network: |
|---|---|---|---|---|---|---|---|
| 6:00 | On | YES | YES | Normal | YES | 8.1 | WFLA |
| 6:05 | On | YES | YES | Normal | YES | 8.1 | WFLA |
| 6:10 | On | YES | YES | Normal | YES | 8.1 | WFLA |
| 6:15 | On | YES | YES | Normal | YES | 8.1 | WFLA |
| 6:20 | On | YES | YES | Normal | YES | 8.1 | WFLA |
| 6:25 | On | YES | YES | Normal | YES | 8.1 | WFLA |
| 6:30 | On | YES | NO | Muted | NO | 8.1 | WFLA |
| 6:35 | On | YES | NO | Muted | NO | 8.1 | WFLA |
| 6:40 | On | YES | NO | Muted | NO | 8.1 | WFLA |
| 6:45 | On | YES | NO | Muted | NO | 8.1 | WFLA |
| 6:50 | On | YES | YES | Normal | YES | 8.1 | WFLA |
| 6:55 | On | YES | YES | Normal | YES | 8.1 | WFLA |
| 7:00 | On | YES | YES | Normal | YES | 8.1 | WFLA |
| 7:05 | On | YES | YES | Normal | YES | 8.1 | WFLA |
| 7:10 | On | YES | YES | Normal | YES | 8.1 | WFLA |
| 7:15 | On | YES | YES | Normal | YES | 8.1 | WFLA |
| 7:20 | On | YES | YES | Low | NO | 8.1 | WFLA |
| 7:25 | On | YES | YES | Low | NO | 8.1 | WFLA |
| 7:30 | On | YES | YES | Low | NO | 8.1 | WFLA |
| 7:35 | On | YES | YES | Low | NO | 8.1 | WFLA |
| 7:40 | On | YES | YES | Normal | YES | 8.1 | WFLA |
| 7:45 | On | YES | YES | Normal | YES | 8.1 | WFLA |

FIG. 3A

| | 302 | 304 | 306 | 318 | 314 | 320 | 322 | 324 |
|---|---|---|---|---|---|---|---|---|
| | Time: | TV On/Off: | Video Status: | Source: | Major/Minor Channel: | Audio Codes: | Code ID: | Signatures: |
| | 6:00 | On (HDMI-CEC) | YES (HDMI-CEC) | STB (HDMI-CEC) | 8.1 (HDMI-CEC) | YES | WFLA | YES |
| | 6:05 | On (HDMI-CEC) | YES (HDMI-CEC) | STB (HDMI-CEC) | 8.1 (HDMI-CEC) | YES | WFLA | YES |
| | 6:10 | On (HDMI-CEC) | YES (HDMI-CEC) | STB (HDMI-CEC) | 8.1 (HDMI-CEC) | YES | WFLA | YES |
| | 6:15 | On (HDMI-CEC) | YES (HDMI-CEC) | STB (HDMI-CEC) | 8.1 (HDMI-CEC) | YES | WFLA | YES |
| | 6:20 | On (HDMI-CEC) | YES (HDMI-CEC) | STB (HDMI-CEC) | 8.1 (HDMI-CEC) | YES | WFLA | YES |
| | 6:25 | On (HDMI-CEC) | YES (HDMI-CEC) | STB (HDMI-CEC) | 8.1 (HDMI-CEC) | YES | WFLA | YES |
| | 6:30 | On (HDMI-CEC) | YES (HDMI-CEC) | STB (HDMI-CEC) | 8.1 (HDMI-CEC) | NO | ? | NO |
| | 6:35 | On (HDMI-CEC) | YES (HDMI-CEC) | STB (HDMI-CEC) | 8.1 (HDMI-CEC) | NO | ? | NO |
| | 6:40 | On (HDMI-CEC) | YES (HDMI-CEC) | STB (HDMI-CEC) | 8.1 (HDMI-CEC) | NO | ? | NO |
| | 6:45 | On (HDMI-CEC) | YES (HDMI-CEC) | STB (HDMI-CEC) | 8.1 (HDMI-CEC) | NO | ? | NO |
| | 6:50 | On (HDMI-CEC) | YES (HDMI-CEC) | STB (HDMI-CEC) | 8.1 (HDMI-CEC) | YES | WFLA | YES |
| | 6:55 | On (HDMI-CEC) | YES (HDMI-CEC) | STB (HDMI-CEC) | 8.1 (HDMI-CEC) | YES | WFLA | YES |
| | 7:00 | On (HDMI-CEC) | YES (HDMI-CEC) | STB (HDMI-CEC) | 8.1 (HDMI-CEC) | YES | WFLA | YES |
| | 7:05 | On (HDMI-CEC) | YES (HDMI-CEC) | STB (HDMI-CEC) | 8.1 (HDMI-CEC) | YES | WFLA | YES |
| | 7:10 | On (HDMI-CEC) | YES (HDMI-CEC) | STB (HDMI-CEC) | 8.1 (HDMI-CEC) | YES | WFLA | YES |
| | 7:15 | On (HDMI-CEC) | YES (HDMI-CEC) | STB (HDMI-CEC) | 8.1 (HDMI-CEC) | YES | WFLA | YES |
| | 7:20 | On (HDMI-CEC) | YES (HDMI-CEC) | STB (HDMI-CEC) | 8.1 (HDMI-CEC) | NO | ? | NO |
| | 7:25 | On (HDMI-CEC) | YES (HDMI-CEC) | STB (HDMI-CEC) | 8.1 (HDMI-CEC) | NO | ? | NO |
| | 7:30 | On (HDMI-CEC) | YES (HDMI-CEC) | STB (HDMI-CEC) | 8.1 (HDMI-CEC) | NO | ? | NO |
| | 7:35 | On (HDMI-CEC) | YES (HDMI-CEC) | STB (HDMI-CEC) | 8.1 (HDMI-CEC) | NO | ? | NO |
| | 7:40 | On (HDMI-CEC) | YES (HDMI-CEC) | STB (HDMI-CEC) | 8.1 (HDMI-CEC) | YES | WFLA | YES |
| | 7:45 | On (HDMI-CEC) | YES (HDMI-CEC) | STB (HDMI-CEC) | 8.1 (HDMI-CEC) | YES | WFLA | YES |

FIG. 3B

METHODS AND APPARATUS TO CLASSIFY ALL OTHER TUNING DATA

CROSS-REFERENCE TO RELATED APPLICATIONS

This patent arises from a continuation of U.S. patent application Ser. No. 16/528,156, know U.S. Pat. No. 11,432, 042), which was filed on Jul. 31, 2019. U.S. patent application Ser. No. 16/528,156 is hereby incorporated herein by reference in its entirety. Priority to U.S. patent application Ser. No. 16/528,156 is hereby claimed.

FIELD OF THE DISCLOSURE

This disclosure relates generally to media monitoring, and, more particularly, to methods and apparatus to classify all other tuning data.

BACKGROUND

Monitoring companies desire knowledge on how users interact with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

FIG. 3A is a table illustration of the example media presentation device activity.

FIG. 3B is a table illustration of the example data store of FIG. 2.

Figure 1:
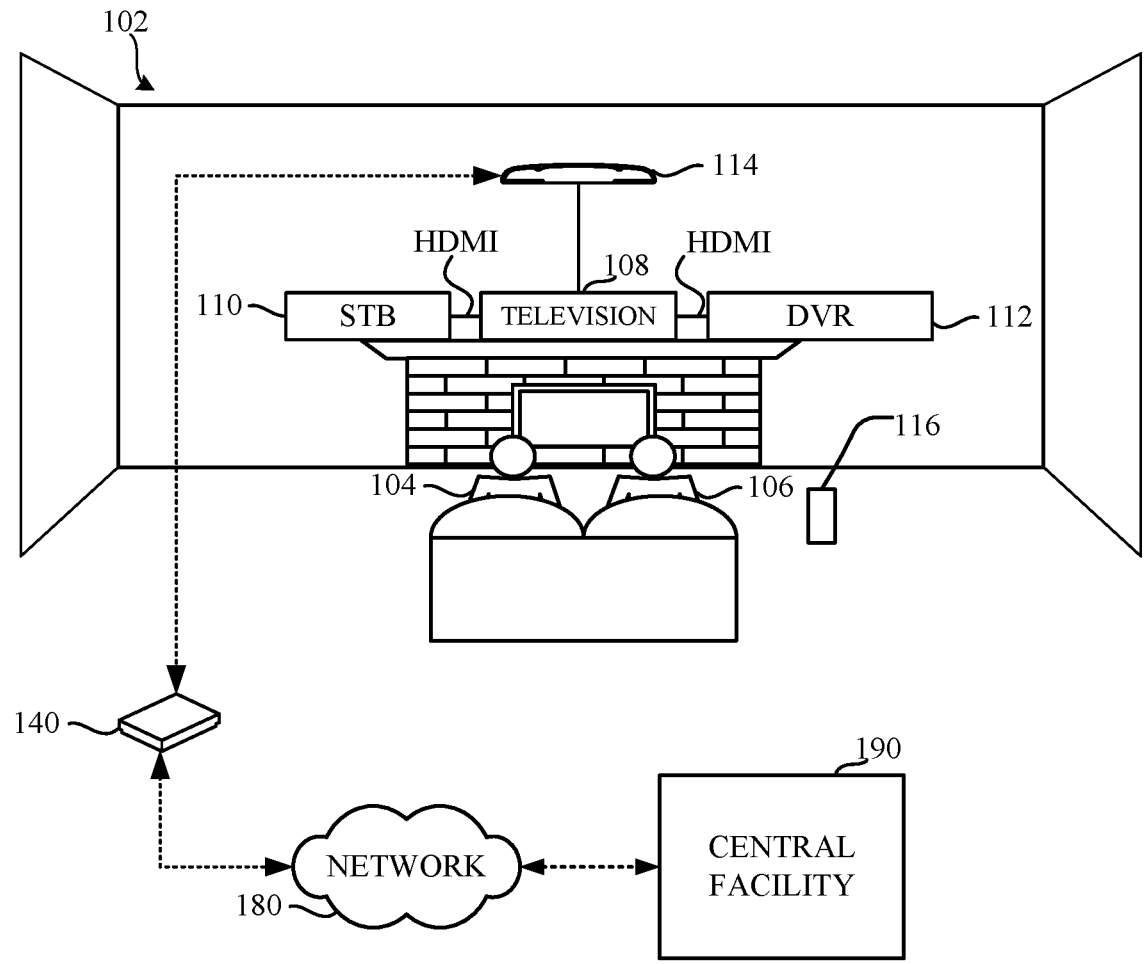
FIG. 1 is a block diagram of an example system constructed in accordance with the teachings of this disclosure for classifying all other tuning (AOT) data.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

When measuring media ratings, it is important to have the ability to track all content and/or all types of content (e.g., advertisements, television shows, movies, or any other type of broadcasting content) that are displayed via a viewing screen. In some examples, a media device is on (e.g., the screen is lit and/or displaying video), but what is being displayed to that screen is undeterminable. This undetermined content, or non-content, becomes classified by a measuring device (e.g., a meter) as All-Other-Tuning (AOT). It is important to keep the amount of AOT data to a minimum because AOT data dilutes the accuracy of the overall ratings when the AOT data becomes significant (e.g., increases).

For media ratings to have value to advertisers or producers of media content, metering data used to generate the ratings must provide an accurate representation of the viewing habits of persons in metered environments (e.g., households). Generating accurate metering data has become more difficult as the audio-visual (AV) devices presenting media content in metered households have become more complex in functionality and interoperability. To reduce the complexity of connecting and operating the AV devices, AV device manufacturers have developed AV network protocols (e.g., high definition multi-media interface—consumer electronic control (HDMI-CEC)) for transmitting digital messages between AV devices.

Messages transmitted via an AV network covey information between devices related to the operating states of the devices (e.g., power status, tuning status, record and playback information, remote control information, etc.). The message data transmitted via an AV network may be utilized (e.g., extracted and analyzed) to identify the operating states of AV devices that are coupled to the AV network and which are presenting media content to people in metered households or other monitored environments. In some examples, identification of the operating states of AV devices is crucial in ensuring that the metering data collected accurately reflects consumption of media content by persons and, as a result, ensuring that the data may be used to produce media ratings with value to advertisers or producers of media content.

Examples disclosed herein provide methods, apparatus and articles of manufacture to reduce the AOT data that is generated when an AV device is on but the content is undeterminable by utilizing information extracted from AV network protocols (e.g., HDMI-CEC). For example, methods and apparatus disclosed herein perform a forward pass and a backward pass on information stored in a reference database to determine if the AOT data is identifiable. For example, a meter can identify media identifying data, store the identified data in a database, and query an AV operating state identifier for information corresponding to operating state characteristics. Examples of operating state characteristics of the AV device include power (On/Off), which device is the active source, tuning information like major and minor channels, etc. for storage in the database. The meter can utilize the populated databases to compare the AOT data with the media identified data of a previous time by analyzing the operating state characteristics of both the AOT data and the media identified data of the previous time (e.g., forward pass) and/or comparing the AOT data characteristics with identified tuning data characteristics of a future time (e.g., backward pass). For example, methods and apparatus disclosed herein query and store time stamped records of the state of the AV device (e.g., On/Off, audio level, major/minor channel information, etc.) in a database for use when identifying the media data that is classified as AOT data.

There are multiple types of scenarios that cause a measuring device, such as a meter, to classify media data as AOT data. One example scenario includes when a viewing screen, such as a TV, displays a blue, black, or static screen without the presence of audio. A second example scenario includes viewable content (e.g., an advertisement, a TV show, etc.) is lacking audio due to low volume or muted conditions.

The second example scenario that includes viewable content but is lacking audio due to low volume or muted conditions, can cause AOT data to rise when the viewer has a habit of background viewing of media content. For example, a viewer may be talking over a telephone and prefer to not have volume distract them but do not turn off the AV device. In this manner, the viewer might mute the AV device but view the presented video. The behavior of this scenario is that the viewing screen is on, there is no audio, and there are changes in video (e.g., the screen displays different images over time). Example methods and apparatus described herein may be used to determine the time at which the audio and/or video data was classified as AOT data and further determine, utilizing the AV network protocol, if at the time the audio and/or video data was classified as AOT data, the viewer had muted the AV device but did not turn the AV device off.

FIG. 1 is a block diagram of an example system constructed in accordance with the teachings of this disclosure for classifying all other tuning (AOT) data. In FIG. 1, an illustration of an example audio-video (AV) environment 102 is depicted to present media content to one or more panelists 104, 106 (e.g., panel members, or persons, etc.) and perform watermark detection and/or signature detection. In the illustrated example of FIG. 1, an example AV environment 102 includes an example media presentation device 108 which is connected via an AV network which, for example, may be implemented as an HDMI-CEC protocol compliant network, to one or more AV devices including, but not limited to, a set top box (STB) 110 and digital video recorder (DVR) 112. HDMI-CEC is only one example AV network protocol that may be used in conjunction with the example methods and apparatus described herein. Thus, many other network protocols could be used instead, such as Syndicat Francais des Constructeurs d'Appareils Radio et Television (SCART). The AV environment 102 includes an example meter 114 coupled to the media presentation device 108 via the AV network. The meter 114 identifies the media presented by the media presentation device 108 and reports media monitoring information to an example central facility 190 of an example media measurement entity via an example gateway 140 and an example network 180. The panelists 104, 106 may interface with the devices connected to the AV environment 102 in many ways, one of which is through the use of one or more remote control devices 116 (e.g., infrared (IR) and/or radio frequency (RF) remote control devices). The remote control device(s) 116 may be designed to communicate with one or more AV devices from a single manufacturer or the remote control device(s) 116 may include a universal remote control designed to communicate with multiple or all of the AV devices connected in the AV environment 102.

In the illustrated example of FIG. 1, the example AV environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the TV 108, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an media measurement entity (e.g., by agreeing to be a panelist) and have provided their demographic information to the media measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example AV environment 102 is a household in the illustrated example of FIG. 1, the example AV environment 102 can additionally or alternatively be any other type(s) of environments such as, for example, a theater, a restaurant, a tavern, a retail location, an arena, etc.

In the illustrated example of FIG. 1, the example media presentation device 108 is a television. However, the example media presentation device 108 can correspond to any type of audio, video and/or multimedia presentation device capable of presenting media audibly and/or visually. In some examples, the media presentation device 108 (e.g., a television) may communicate audio to another media presentation device (e.g., an audio/video receiver) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

In examples disclosed herein, a media measurement entity provides the meter 114 to the panelist 104, 106 (or household of panelists) such that the meter 114 may be installed in the AV environment 102. In some examples, the meter 114 is installed by the panelists 104, 106 by electronically connecting the meter 114 to the media presentation device 108 and configuring the meter 114 to transmit media monitoring information to the central facility 190. In examples disclosed herein, configuration of the meter 114 is performed by an installer (e.g., personnel from the media measurement entity) who installs the meter 114 in the AV environment 102 and configures the meter 114.

The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner such as, for example, by physically mailing the meter 114, by physically mailing a memory of the meter 114, etc.

The meter 114 of the illustrated example combines media measurement data, people metering data, and operating state characteristic data. For example, media measurement data is determined by monitoring media output by the media presentation device 108 and/or other media presentation device(s), audience identification data (also referred to as demographic data, people monitoring data, etc.) is determined from people monitoring data provided to the meter 114, and operating state characteristic data is determined by querying an AV network using, for example, HDMI-CEC protocol, of an active device such as the media presentation device 108, STB 110, and/or DVR 112. Thus, the example meter 114 provides multi-purpose functionality of a media measurement meter that is to collect media measurement data, a people meter that is to collect and/or associate demographic information corresponding to the collected media measurement data, and a media interface that is to collect and/or associate operating state characteristic information with media measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 108. To extract media identification data, the meter 114 of the illustrated example of FIG. 1 monitors for watermarks (sometimes referred to as codes) and signatures included in the presented media.

In examples disclosed herein, to monitor media presented by the media presentation device 108, the meter 114 of the illustrated example senses audio (e.g., acoustic signals or ambient audio) output (e.g., emitted) by the media presentation device 108 and/or some other audio presenting system (e.g., an audio/video receiver). For example, the meter 114 processes the signals obtained from the media presentation device 108 to detect media and/or source identifying signals (e.g., audio watermarks) embedded in portion(s) (e.g., audio portions) of the media presented by the media presentation device 108. To, for example, sense ambient audio output by the media presentation device 108, the meter 114 of the illustrated example includes an example audio sensor (e.g., a microphone). In some examples, the meter 114 may process audio signals obtained from the media presentation device 108 via a direct cable connection (e.g., HDMI) to detect media and/or source identifying audio watermarks embedded in such audio signals.

The example gateway 140 of the illustrated example of FIG. 1 is a router that enables the meter 114 and/or other devices in the AV environment 102 (e.g., the media presentation device 108, the STB 110, the DVR 112, etc.) to communicate with the network 180 (e.g., the Internet.)

In some examples, the example gateway 140 facilitates delivery of media from a media source(s) to the media presentation device 108 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 180 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the AV environment 102. In the illustrated example, the LAN is a wireless local area network (WLAN), and allows the meter 114, the media presentation device 108, etc., to transmit and/or receive data via the Internet. Alternatively, the gateway 140 may be coupled to such a LAN. In examples disclosed herein, the example gateway 140 and/or connectivity to the Internet via the gateway 140 is provided by the panelists 104, 106. That is, the example gateway 140 is a device that is owned and/or operated by the panelists 104, 106, and is not provided by the media measurement entity. In some examples, the example gateway 140 may be provided by an Internet Service Provider (ISP) to facilitate communication between the LAN provided by the gateway 140 and the network 180 (e.g., the Internet). Additionally, in examples disclosed herein, the meter 114 utilizes the LAN hosted by the example gateway 140 to transmit and/or receive information to and/or from the central facility 190. Transmitting information using a LAN provided by the example gateway 140 ensures that information is reliably transmitted to the central facility 190. Advantageously, other costlier approaches to transmitting information to the central facility 190 such as, for example, inclusion of a cellular transceiver in the meter 114 need not be utilized.

The network 180 of the illustrated example is a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. In some examples disclosed herein, the example central facility 190 of FIG. 1 combines media identification data and program identification data from multiple households to generate aggregated media monitoring information. In some examples disclosed herein, the central facility 190 may generate a report for advertisers, program producers and/or other interested parties based on the compiled statistical data. Such reports include extrapolations about the size and demographic composition of audiences of content, channels and/or advertisements based on the demographics and behavior of the monitored panelists. Additionally, the example central facility 190 performs methods disclosed herein corresponding to reducing AOT data received by example meter(s) 114.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device directly coupled to the media presentation device 108 via an AV network protocol (e.g., HDMI-CEC). To identify and/or confirm the presence of a panelist present in the AV environment 102, the example meter 114 of the illustrated example includes a display. For example, the display provides identification of the panelists 104, 106 present in the AV environment 102. For example, in the illustrated example, the meter 114 displays indicia (e.g., illuminated numerical numerals 1, 2, 3, etc.) identifying and/or confirming the presence of the first panelist 104, the second panelist 106, etc. In such examples, such an indicia (e.g., illuminated numerical numerals 1, 2, 3, etc.), may be illuminated in response to a communication received from the central facility 190. In the illustrated example, the meter 114 is affixed to a top of the media presentation device 108. However, the meter 114 may be affixed to the media presentation device in any other orientation such as, for example, on a side of the media presentation device 108, on the bottom of the media presentation device 108, etc.

Before discussing the example methods and apparatus for classifying AOT data in detail, a brief discussion of the manners in which AV devices are connected to and communicate via an AV network is first provided below. Available AV devices, such as those depicted in FIG. 1, are becoming more complex in functionality and interoperability with other AV devices. As a result, manufacturers are exploring new, user friendly ways of standardizing interfaces to simplify for the user the setup and operation of these devices. For example, HDMI-CEC is one AV network protocol that simplifies the setup and operation of an otherwise complex arrangement of AV network devices. However, HDMI-CEC is only one example of a network protocol and many other well-known protocols could be used, such as the various implementations of AV.link including EasyLink and SmartLink. One particular example of a simplified interface is the one-button-play feature that enables a user to activate one button or control to cause devices coupled to an AV network to be powered on, select the proper media source, and begin playing the media content.

To enable an AV network to provide features such as one-button-play functionality and other high level control functions, each AV device connected to the AV network must be able to address directly all other AV devices on the AV network. To accomplish this, each AV device on the network is assigned a physical address and a logical address. For example, when an AV device is added to the AV network, the AV device is assigned a physical address corresponding to its physical location on the AV network and a logical address corresponding to the functionality of the device. If an AV device connected to the AV network does not fully support the protocol utilized in the AV network, the AV device may be assigned a physical address but not a logical address. Multiple methods of addressing could be used and one such example is set forth in the High-Definition Multimedia Interface specification, version 1.3a provided through HDMI Licensing, LLC, the entire disclosure of which is incorporated herein by reference.

An HDMI-CEC network is created through the interconnection of two or more HDMI-CEC compliant devices. Physical addresses are assigned to an AV device on the HDMI-CEC network according to the location at which the AV device is connected to the AV network and are used to ensure that media content is routed correctly from a source AV device (e.g., a DVR) to a media presentation device (e.g., a television). The root device of the AV network (e.g., a television) is always assigned the physical address 0.0.0.0. A first AV device on the AV network may have one or more ports available for connecting a second AV device to the AV network. The physical address of the second AV device is created by incorporating the physical address of the first AV device and the number of the port of the first AV device to which the second AV device is connected. For example, a second AV device may be connected to port 2 of a first AV device having the physical address of 1.2.0.0 and, therefore, the second AV device may be assigned the physical address of 1.2.2.0.

Another method of addressing AV devices on an AV network uses logical addressing based on the functionality (e.g., television, tuner, recording device, playback device or audio system) of the AV device. An AV device may incorporate one or more functionalities such as, for example, a STB may have two tuners and two digital recording devices implemented internally. Each functionality type (e.g., recording device or tuner) implemented within a device is assigned a logical address. However, if an AV device contains multiple instances associated with a functionality, the AV device may only be assigned one logical address of that functionality, and the AV device may be required to manage the multiple instances of functionality internally. In the above-mentioned STB example, the STB may be assigned a physical address of 1.2.0.0, a logical address for a tuner, and another logical address for a recording device. The STB may then manage second instances of a tuner and a recording device internally.

HDMI-CEC is an AV device network communication protocol designed to be implemented using a single wire, multi-drop bus for which all messages transferred via the AV network (i.e., via the single wire bus) are received substantially simultaneously by all AV devices on the AV network. The messages transmitted via the AV network contain fields that indicate the message source (e.g., the logical address of the AV device sending the message), the message destination (e.g., the logical address of the AV device intended as the recipient of the message) and an operation code (e.g., a command to the destination device or request for status information). Some messages (e.g., broadcast messages) contain a message destination that indicates that all AV devices on the AV network are the intended recipients of the messages. The AV devices indicated as the message destination process the operation code sent in the message and reply to the AV device indicated as the message source.

Figure 2A:
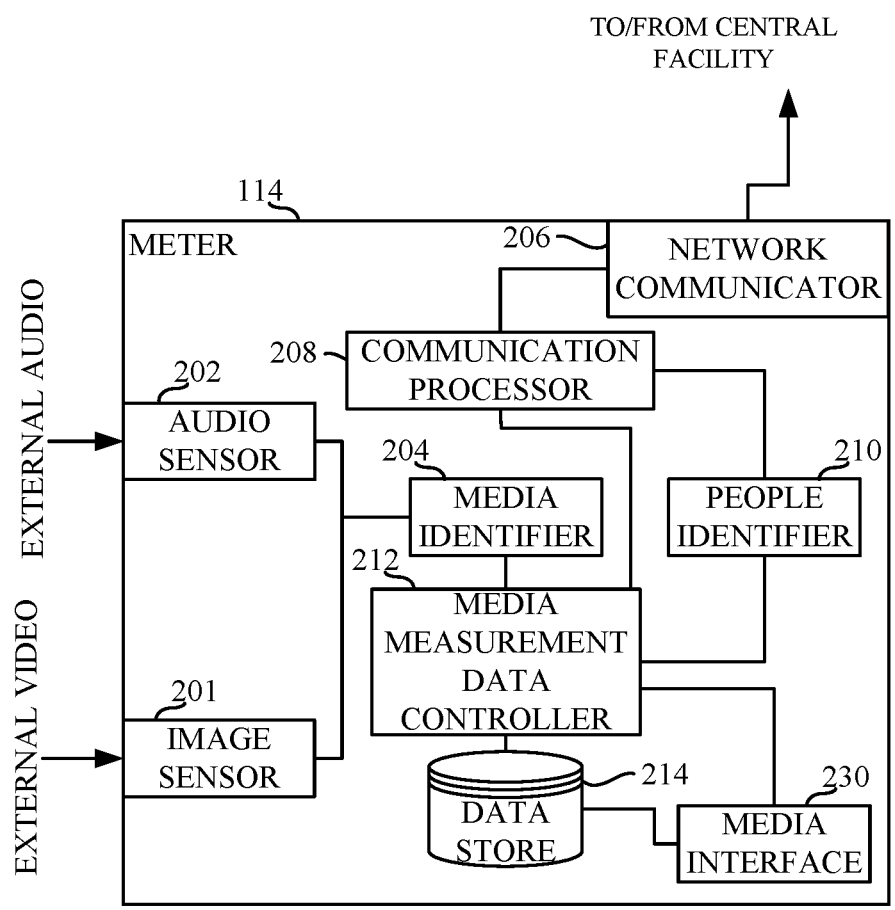
FIG. 2A is a block diagram of the example meter of FIG. 1 to collect media data.

FIG. 2A is a block diagram of the example meter of FIG. 1 to collect media data. The example meter 114 of FIG. 2A includes an example image sensor 201, an example audio sensor 202, an example media identifier 204, an example network communicator 206, an example communication processor 208, an example people identifier 210, an example media measurement data controller 212, an example data store 214, and an example media interface 230.

The example image sensor 201 of the illustrated example of FIG. 2A is a camera. The example image sensor 201 receives light waves, such as the light waves emitting from the example media presentation device 108, and converts them into signals that convey information. Additionally or alternatively, the example image sensor 201 may be implemented by a line input connection, where the video and images presented by the example media presentation device 108 are carried over the example AV network (e.g., HDMI cable) to the example meter 114. The example image sensor 201 may not be included in the example meter 114. For example, it may not be necessary for the meter 114 to utilize the image sensor 201 to identify media data. However, in some examples, the image sensor 201 can be utilized for detection of media data.

The example audio sensor 202 of the illustrated example of FIG. 2A is a microphone. The example audio sensor 202 receives ambient sound (e.g., free field audio) including audible media presented in the vicinity of the meter 114. Additionally or alternatively, the example audio sensor 202 may be implemented by a line input connection. The line input connection may allow an external microphone to be used with the meter 114 and/or, in some examples, may enable the audio sensor 202 to be directly connected to an output of a media presentation device (e.g., an auxiliary output of a television, an auxiliary output of an audio/video receiver of a home entertainment system, etc.) Advantageously, the meter 114 is positioned in a location such that the audio sensor 202 receives ambient audio produced by the television and/or other devices of the home entertainment system with sufficient quality to identify media presented by the media presentation device 108 and/or other devices of the AV environment 102 (e.g., a surround sound speaker system). For example, in examples disclosed herein, the meter 114 may be placed on top of the television, secured to the bottom of the television, etc.

In the illustrated example of FIG. 2A, one audio sensor 202 is shown. However, any other number of audio sensor(s) may additionally or alternatively be used. For example, two audio sensors may be used, four audio sensors may be used, etc. Audio received by the example audio sensor 202 is passed to the media identifier 204 for identification.

The example media identifier 204 of the illustrated example of FIG. 2A analyzes signals received via the image sensor 201 and/or audio received via the audio sensor 202 and identifies the media being presented. The example media identifier 204 of the illustrated example outputs an identifier of the media (e.g., media-identifying information) to the media measurement data controller 212. In examples disclosed herein, the media identifier 204 utilizes audio and/or video watermarking techniques to identify the media. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or one or more identifier(s) that may be mapped to media identifying information, into an audio and/or video component of the media. In some examples, the audio and/or video component of the media is selected to have a signal characteristic sufficient to hide the watermark. As used herein, the terms "code" and/or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. In some examples, to identify watermarked media, the watermark(s) are extracted and used to access a table of reference watermarks that are mapped to media identifying information.

In some examples, the media identifier 204 may utilize signature-based media identification techniques. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The example network communicator 206 of the illustrated example of FIG. 2A is a communication interface configured to receive and/or otherwise transmit corresponding communications to and/or from the central facility 190. In the illustrated example, the network communicator 206 facilitates wired communication via an Ethernet network hosted by the example gateway 140 of FIG. 1. In some examples, the network communicator 206 is implemented by a Wi-Fi radio that communicates via the LAN hosted by the example gateway 140. In other examples disclosed herein, any other type of wireless transceiver may additionally or alternatively be used to implement the network communicator 206. In examples disclosed herein, the example network communicator 206 communicates information to the communication processor 208 which performs actions based on the received information. In other examples disclosed herein, the network communicator 206 may transmit media measurement information provided by the media measurement data controller 212 (e.g., data stored in the data store 214) to the central facility 190 of the media measurement entity.

The example communication processor 208 of the illustrated example of FIG. 2A receives information from the network communicator 206 and performs actions based on that received information. For example, the communication processor 208 packages records corresponding to collected media data and transmits records to the central facility 190. In examples disclosed herein, the communication processor 208 communicates with the media identifier 204 and/or a media measurement data controller 212 information from the network communicator 206 that may request metering data. In other examples disclosed herein, the communication processor 208 may process and/or otherwise package information from the network communicator 206 for use by the media measurement data controller 212.

The example people identifier 210 of the illustrated example of FIG. 2A determines audience identification data representative of the identities of the audience member(s) (e.g., panelists) present in the AV environment 102. In some examples, the people identifier 210 collects audience identification data by periodically or a-periodically prompting audience members in the AV environment 102 to identify themselves as present in the audience. Panelists may identify themselves by, for example, pressing a button on a remote, speaking their name, etc. In some examples, the people identifier 210 prompts the audience member(s) to self-identify in response to one or more predetermined events (e.g., when the media presentation device 110 is turned on, a channel is changed, an infrared control signal is detected, etc.). The people identifier 210 provides the audience identification data to the media measurement data controller such that the media measurement data can be correlated with the media identification data to facilitate an identification of which media was presented to which audience member.

The example media measurement data controller 212 of the illustrated example of FIG. 2A receives media identifying information (e.g., a code, a signature, etc.) from the media identifier 204 and audience identification data from the people identifier 210 and stores the received information in the data store 214. In some examples, upon identification of media, in response to execution of a command, and/or other events within the media measurement data controller 212, the media measurement data controller 212 may provide a message to the media interface 230 requesting operating state characteristics of the active device that generated the media data. Such a message may be sent to the operating state identifier 221 via the AV network controller 224. The example media measurement data controller 212 periodically and/or a-periodically transmits, via the network communicator 206, the media measurement information stored in the data store 214 to the central facility 190 for post-processing of media measurement data, aggregation and/or preparation of media monitoring reports. In some examples, the media measurement data controller 212 performs forward pass and backward pass operations on the media data stored in the example data store 214. For example, the media measurement data controller 212 may determine the media identifier 204 was unable to classify the media data according to the television broadcasts, radio broadcasts, advertisements (television and/or radio), downloaded media, streaming media, prepackaged media, etc., and queries the data store 214 for operating state characteristics of the active device at the time the media identifier 204 was unable to identify the media data. Further, if the example media measurement data controller 212 determines the active device was on and presenting video or audio, the media measurement data controller 212 will perform forward pass on the data stored in the example data store 214 and further perform backward pass if the forward pass operation did not identify the AOT data. The example media measurement data controller 212 is described in further detail below in connection with FIG. 2C.

The example data store 214 of the illustrated example of FIG. 2A may be implemented by any device for storing data such as, for example, flash memory, magnetic media, optical media, etc. Furthermore, the data stored in the example data store 214 may be in any data format such as, for example, binary data, comma delimited data, tab delimited data, structured query language (SQL) structures, etc. In the illustrated example, the example data store 214 stores media identifying information collected by the media identifier 204 and audience identification data collected by the people identifier 210. In some examples, the example data store 214 additionally stores operating state characteristics of the devices in the example AV network (e.g., television 108, STB 110, DVR 112, etc.) received from the example operating state identifier 221 by the example media interface. The example data store 214 is described in further detail below in connection with FIG. 3B.

The example media interface 230 of the illustrated example of FIG. 2A queries the AV network using, for example the HDMI-CEC protocol, for information corresponding to the operating state characteristics of the active device. The example media interface 230 is the physical connection to the HDMI or other AV network protocol that is coupled between the example meter 114 and the example media presentation device 108. In some examples, the media interface 230 can extract messages transmitted over the AV network protocol, analyze the message, and store the relevant information in the data store 214. In other examples, the media interface 230 polls the bus monitor 228 for analyzed information corresponding to the operating state characteristics of the active device and stores the analyzed information in the data store 214.

Figure 2B:
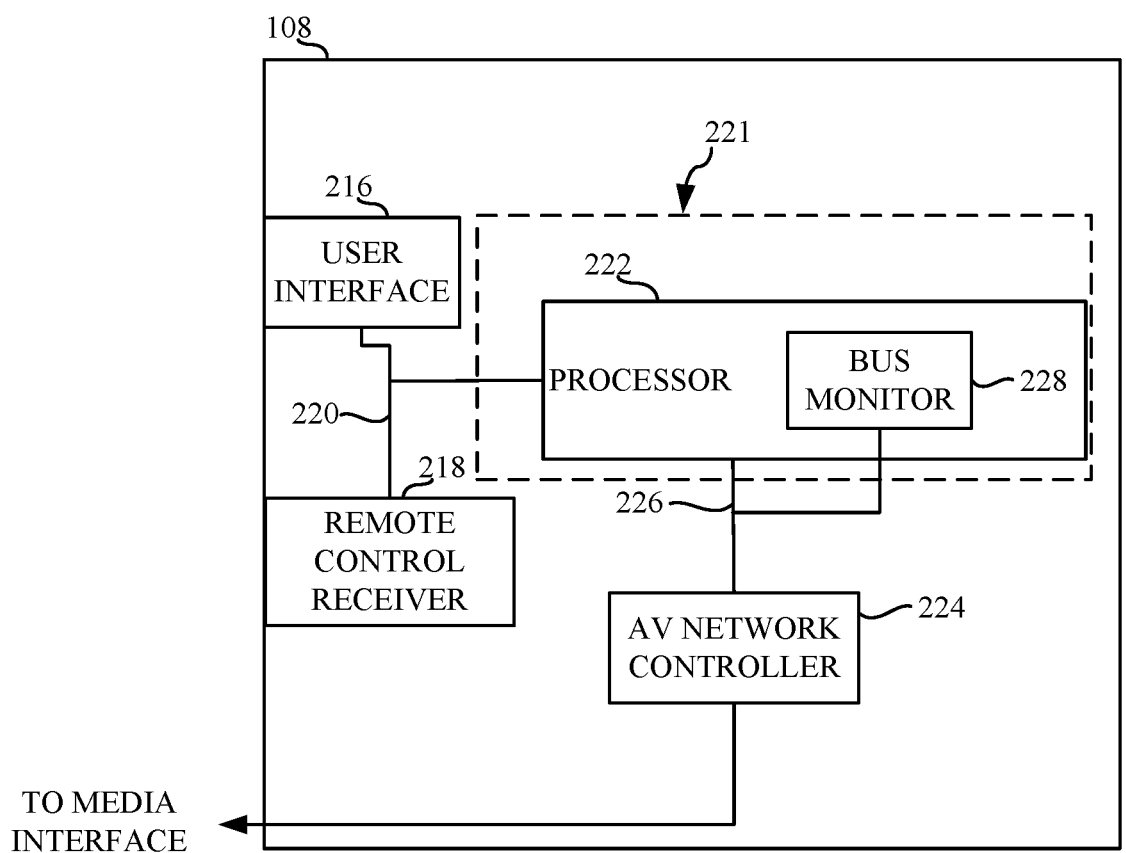
FIG. 2B is a block diagram of the example media presentation device of FIG. 1 to provide operating state characteristics to the example meter of FIG. 1.

The example media presentation device 108 of the illustrated example of FIG. 2B may include a user interface 216 that may include one or more push buttons, keys, switches, knobs, etc. to provide signal inputs and/or commands to the media presentation device 108. The user interface 216 may also include a liquid crystal display to provide visual feedback to a user (e.g., the panelists 104, 106). The media presentation device 108 may also include a remote control receiver 218 to receive signals (e.g., infrared or radio frequency) containing commands and/or other information transmitted by the remote control device 116. Commands and/or other information received via the user interface 216 and/or the remote control receiver 218 are conveyed via a data bus 220 to a processor 222. The panelists 104, 106 may use the remote control device 116 (e.g., a universal remote control) that transmits to the media presentation device 108 commands and/or other information intended to be transmitted via the AV network to another AV device (e.g., the DVR 112). The processor 222 controls the operation of the media presentation device 108 based on the commands and/or other information received via the data bus 220.

The media presentation device 108 may also send and receive commands and/or other information via the AV network with an AV network controller 224. The AV network controller 224 is capable of exchanging commands and/or other information with other AV network devices (e.g., the television 108, the DVR 112, etc.) via the AV network using communications compliant with any desired protocol such as, for example, HDMI-CEC. The AV network controller 224 may be implemented within in a single integrated circuit, with multiple integrated circuits or combined within an integrated circuit with other functionality. The processor 222 and the AV network controller 224 communicate via a bus 226, which may be implemented as an Inter-Integrated Circuit (I²C) bus or any other bus capable of transmitting data between integrated circuits. Commands received by the remote control receiver 218 and/or the manual user interface 216 may be processed by the processor 222 and transferred via the bus 226 or via an additional data bus such as the data bus 220. Although the data buses 220 and 226 are depicted as separate buses, the functionality of these buses may be implemented using a single bus. The example operating state identifier 221 also includes a bus monitor 228 implemented within the processor 222 and is designed to extract messages conveyed between networked AV devices via the bus 226.

In the illustrated example, the operating state identifier 221 implemented within the media presentation device 108 is configured to identify the operating state of any AV device communicatively coupled to the AV network. The operating state identifier 221 identifies the operating state of an AV device by monitoring messages transmitted via the bus 226, extracting messages transmitted via the bus 226 between the processor 222 and the AV network controller 224, analyzing the extracted messages and requesting any missing information associated with the operating state of the AV device. The operating state identifier 221 may identify the operating state of an AV device on the AV network by analyzing the extracted messages along with any missing information returned by the AV device.

To examine the illustrated example in more detail, the operating state identifier 221 may be used to identify the operating state characteristics of an AV device (e.g., media presentation device 108, the STB 110, the DVR 112, etc.) on the AV network that is actively providing media content to a media presentation device 108 (e.g., the television 108) consumed (e.g., viewed and/or listened to) by the panelists 104, 106. Further, the operating state identifier 221, as illustrated, is implemented within the processor 222 of the media presentation device 108 but could be implemented within a processor within any device communicatively coupled to the AV network.

A panelist 104, 106 may interact with the media presentation device 108 via the user interface 216 (e.g., by operating buttons, keys, switches or knobs) or via a remote control device 116 via the remote control receiver 218, or a combination of these interfaces. The remote control device 116 (FIG. 1), for example, may be a universal remote control capable of communication with one or more AV devices (e.g., the media presentation device 108, the STB 110, and/or the DVR 112) connected to the AV network. Commands and/or messages received via the user interface 216 or the remote control receiver 218 are transmitted via the bus 220 to the processor 222 for processing. For example, the processor 222 may process a command to determine whether the command is intended to be received and processed by the media presentation device 108 or further transmitted via the AV network to another AV device for processing. If the command is transmitted to another AV device (e.g., STB 110 or the DVR 112), the processor 222 conveys a message to the AV network controller 224 via the bus 226 that includes the DVR 112 as the message destination. As noted above, the buses 226 and 220 are shown as independent buses, but the functionality of these buses may be implemented within a single bus.

The example bus monitor 228 of the illustrated example of FIG. 2B monitors communications (e.g., messages) conveyed on the bus 226 and extracts information associated with the commands and/or messages conveyed between the AV network controller 224 and the processor 222. The commands and/or messages may be associated with the operation of any device communicatively coupled to the AV network, including the media presentation device 108. Additionally, the bus monitor 228 provides the extracted information associated with the commands and/or messages to the media interface 230 when requested and/or queried.

Further, the bus monitor 228 analyzes the extracted messages and may request missing information that may be used to identify the operating state of an AV device. The missing information may include, but is not limited to, commands provided to the AV device through the user interface 216 or messages transmitted through a remote control directly to the AV device and not conveyed via the AV network. For example, the panelists 104, 106 (FIG. 1) may select a channel of a tuner implemented within the STB 110 via a button on the user interface 216. The bus monitor 228, for example, may request the missing information as a result of the analysis performed on the extracted messages or at predetermined time intervals. The bus monitor 228 then identifies the operating state of the AV device (e.g., the media presentation device 108, the STB 100, the DVR 112) by analyzing the extracted messages along with the missing information received in response to the request.

The messages transmitted via the AV network contain fields that indicate the message source (e.g., the logical address of the AV device sending the message), the message destination (e.g., the logical address of the AV device intended as the recipient of the message) and an operation code (e.g., a command to the destination device or a request for status information). In some examples, when a message is analyzed by the bus monitor 228, the information provided in the message is extracted, analyzed, time stamped, and stored in a memory of the processor 222. The example memory may be utilized to refer to when communicating information to the example meter 114, such as information corresponding to operating state characteristics of the AV device at certain times.

Figure 2C:
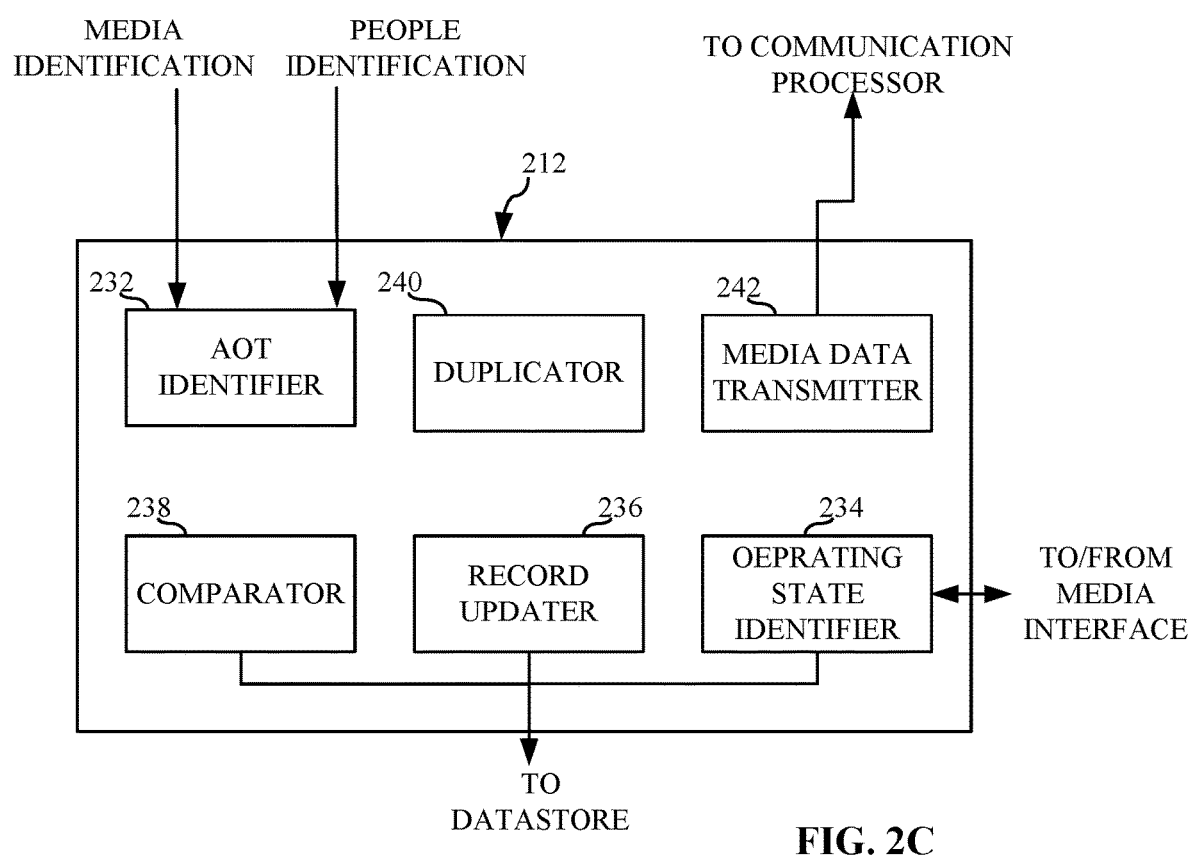
FIG. 2C is a block diagram of the example media measurement data controller of FIG. 2A to perform media classification operations on collected media data.

Turning to FIG. 2C, the example media measurement data controller 212 is illustrated to identify an AOT classification of media data and perform forward pass and/or backward pass on the AOT media data. The example media measurement data controller 212 of FIG. 2C includes an example AOT identifier 232, an example operating state identifier 234, an example record updater 236, an example comparator 238, an example duplicator 240, and an example media data transmitter 242.

The example AOT identifier 232 of the illustrated example of FIG. 2C receives media identification from the example media identifier 204 (FIG. 2A) and people identification from the example people identifier 210 (FIG. 2A) and determines if the media data has been identified or classified as AOT. For example, the AOT identifier 232 determines if media data has been tagged with a television broadcasts, radio broadcasts, advertisements (television and/or radio), downloaded media, streaming media, prepackaged media, etc. If the media data is not tagged with respective identification data, then the media data is identified at AOT, and a notification may be provided to the example operating state identifier 234 to initiate operating state characteristic retrieval from the example media interface 230. If the media data is tagged with respective identification data, the example AOT identifier 232 forwards the identified media data to the example record updater 236 to store the identified media data as a record in the example data store 214.

The example operating state identifier 234 of the illustrated example of FIG. 2C receives a request from the example AOT identifier 232 to initiate operating state characteristic retrieval of the example media interface 230. For example, the AOT identifier 232 receives new media data and notifies the operating state identifier 234 to query the media interface 230 for operating state characteristics of the active device at the time the example media identifier 204 processed signals from the example image sensor 201 and/or the example audio sensor 202 and provided the processed signals to the example media measurement data controller 212. The example operating state identifier 234 may be initiated when media data is classified as AOT and when media data is identified. In this manner, the operating state identifier 234 retrieves the operating state characteristics from the media interface 230 and stores the information in the example data store 214 along with a time stamp. In some examples, the operating state identifier 234 receives tuning data, determines the active device (e.g., the STB 110, the TV 108, the DVR 112) and determines the state of the active device (e.g., On/Off) to classify the media data. For example, if the operating state identifier 234 determines the active device is not on, the operating state identifier notifies the record updater 236 to create an AOT record. Additionally or alternatively, the operating state identifier 234 may notify the comparator to compare operating state characteristics at different time stamps for a forward pass operation or a backward pass operation.

The example record updater 236 of the illustrated example of FIG. 2C creates and updates records in the example data store 214. For example, the record updater 236 receives media data from the AOT identifier 232 and operating state characteristics from the example operating state identifier 234 and creates a record with a time stamp to store in the example data store 214. In some examples, the record updater 236 replaces an initial record, such as a record with AOT data. For example, the record updater 236 may be prompted during a forward pass operation and/or a backward pass operation to replace an AOT data record with an identified media data record. In this manner, the data store 214 includes up-to-date records for subsequent transmission to the example central facility 190. The example record updater 236 may periodically and/or a-periodically notify the example media data transmitter 242 to transmit the media measurement information stored in the data store 214 to the central facility 190 for post-processing.

The example comparator 238 of the illustrated example of FIG. 2C is initiated during forward pass operation and/or backward pass operation to compare operating state characteristics of records at different time stamps. For example, the record updater 236 may initialize a variable "T" to be equal to 2, wherein T corresponds to a time, and 2 corresponds to the first record in the data store 214 classified as AOT data. In this manner, the example comparator 238 retrieves the record at time T and a record at time T−1, wherein the record at time T−1 is the record stored at a time before T. The example comparator 238 analyzes the two records to determine similarities. For example, the comparator 238 compares the operating state characteristics, such as channel information, to determine if T has equal channel information to T−1. In some examples, the comparator 238 queries the data store 214 for media identifying data at time T−1 when the channel information at T−1 and T are equal. In this manner, the example comparator 238 can identify media at time T if the example comparator 238 retrieves media identifying data at time T−1.

The example duplicator 240 of the illustrated example of FIG. 2C duplicates media identifying data when requested by the example comparator 238. The example duplicator 240 may receive media identifying data from the example comparator 238 and make a second copy of the media identifying data to provide to the example record updater 236. For example, the comparator 238 notifies the duplicator 240 that media identifying data was retrieved at from the record stored at time T−1, the duplicator 240 makes a copy of the media identifying data, and provides the copy to the record updater 236 to replace the AOT data in the record stored at time T with the copy of the media identifying data. In this manner, the example record updater 236 removes the AOT data from the data store 214 and inserts the copied media identifying data into the record with the timestamp T.

The example media data transmitter 242 of the illustrated example of FIG. 2C transmits the records in the example data store 214 to the example communication processor 208 (FIG. 2A). The example media data transmitter 242 is notified by the example record updater 236 when processing of the records in the data store 214 have been completed. For example, when forward pass and backward pass have been performed on all records in the data store 214, the media data is ready to be transmitted to the central facility 190 for further processing. In some examples, the media data transmitter 242 is queried by the example communication processor 208 for media data stored in the data store 214.

FIGS. 3A and 3B illustrate data tables that may be representative of information stored in the example data store 214. For example, FIG. 3A is representative of the media presentation device activity and is illustrated as a table with a variety of headers and time stamps. The example media measurement data controller 212 and the example media interface 230 stores information corresponding to time (302), TV 108 On/Off state (304), video status (306), audio status (308), volume (310), match (e.g., media identified status) (312), major/minor channel (314), and the broadcast network (316) in the example data store 214. FIG. 3B is representative of meter data (e.g., data determined by devices of the example meter 114) and is illustrated as a table with a variety of headers and timestamps. The example media measurement data controller 212 and the example media interface 230 stores information corresponding to time (302), TV 108 On/Off state (304), video status (306), source (318), major/minor channel (314), audio codes (320), code identifier (322), and signatures (324).

Turning to FIG. 3A, the time 302 corresponds to the time the example media identifier 204 receives and analyzes media data and provides to the media measurement data controller to create a record of media data. For example, the data store 214 collects media data from 6:00 μm to 7:45 pm in intervals of five minutes (e.g., 300 seconds). In some examples, the time 302 is referenced to for performing forward pass and backward pass operations on the media data classified as AOT data.

In the data store 214 of FIG. 3A, the video status column 306 and the audio status column 308 are determined by the example image sensor 201 and the example audio sensor 202 of the example meter 114. For example, if the image sensor 201 is receiving variations of light waves at the first time of 6:00 μm, the video status column 306 is labeled "YES." Alternatively, example current sensing attachments of the meter 114, not described herein, may detect a constant electrical current from the active device, indicative of presented video. In this manner, the example video status column 306 is labeled "YES." If the image sensor 201 is not receiving variations of light waves at the first time of 6:00 μm, the video status column 306 will labeled as "NO." Similarly, if the example audio sensor 202 is receiving ambient audio or not receiving ambient audio, the audio status column 308 will be labeled accordingly.

In the data store 214 of FIG. 3A, the TV On/Off 304 column, the volume column 310, and the major/minor channel column 314 each correspond to information received from the AV network controller 224 by the media interface 230 about the active state of the example media presentation device 108. For example, the measurement media data controller 212 notifies the media interface 230 to extract information from the AV network, using for example HDMI-CEC protocol, at the first time of 6:00 pm to determine if the media presentation device 108 is on, if the volume is normal, and what the channel is at that time. The example media interface 230 may analyze the messages on the AV network protocol or may query the example bus monitor 228 for faster data transfer to the example data store 214.

In some examples, when the major/minor channel information is extracted, the major/minor channel column 314 may be indicative of a frequency band variable corresponding to the tuned channel. For example, the frequency band is an interval in the frequency domain that carries media content, such as a television broadcast, a radio broadcast, etc., to be distributed via the media presentation device 108 to the panelists 104, 106. The example major/minor channel column 314 can be utilized to identify the AOT data as a particular media source for media ratings. For example, the major/minor channel column 314 can be referred to during the forward pass and backward pass operation in the meter 114 and at the central facility 190.

In the illustrated example of FIG. 3A, the broadcast network 316 may be determined by the example media identifier 204 when the example media identifier 204 analyzes the incoming audio signals and video signals from the image sensor 201 and audio sensor 202. For example, the media identifier 204 performs watermarking and signature techniques to identify the media (e.g., broadcast network) presented to the panelists 104, 106 by extracting the code or signature from the incoming audio and video signals and matching them to reference broadcast audio and video data that are stored in a reference database. When the example media identifier 204 identifies the media data, the example media measurement data controller 212 stores the identified media data in the data store 214 along with a time stamp of the record. In this manner, the media measurement data controller 212 labels the match column 312 with a "YES" when the media was identified. If the media data was not identified by the media identifier 204, the example media measurement data controller 212 will store the record as AOT data in the data store 214 at the particular time of AOT identification and label the match column 312 as "NO."

Turning to FIG. 3B, the tv on/off column 304, the video status column 306, the major/minor channel column 314, and the source 318 column are determined by the AV network controller 224 using, for example, an HDMI-CEC protocol. For example, the AV network controller 224 utilizes the HDMI-CEC protocol to determine the source that is presenting media to the panelists 104, 106. In FIG. 3B, the AV network controller 224 informs the media interface 230 that the source of media is a STB 110, therefore the source column 318 is populated with STB.

In the illustrated example of FIG. 3B, the example audio code column 320 is determined by the media identifier 204 of the example meter 114. For example, if the audio of the presented media includes embedded audio codes, the example media identifier 204 can detect the audio code and determine the code identifier (e.g., the broadcast network, a television network, etc.) for storing in the example Datastore 214. The audio code column 320 and the code identifier column 322 can be utilized by the example media measurement data controller 212 to determine when the media identifier 204 did not extract and identify an audio code identifier.

In the illustrated example of FIG. 3B, the example signatures column 324 which can be determined by the example media identifier 204. For example, signatures are representative of a media signal (e.g., an audio signal and/or a video signal) output by a monitored media device and compared to one or more reference signatures corresponding to known (e.g., reference) media sources. The example media measurement data controller 212 populates the signatures column 324 with a "YES" when signatures are matched and a "NO" when signatures are not matched. The signatures column 324 may be utilized by the media example AOT identifier 232 of the example media measurement data controller 212 to inform when media identifying data was not identified.

In some examples, when the meter 114 is collecting live monitoring records, the media measurement data controller 212 is receiving identified or unidentified media records from the media identifier 204 and further performing a forward pass operation to identify the unidentified media records. For example, while the meter 114 is collecting the live monitoring records, time is moving forward, and the records are being stored in the data store 214. During forward pass operation, the example media measurement data controller 212 determines that media data was unidentified (e.g., classified as AOT data) and, in response to such a determination, checks the data store 214 for operating state characteristics of the active device during the time of the unidentified media data. For example, the media measurement data controller 212 may initially determine that the active device was on and presenting video (e.g., tv On/Off column 304 and video status column 306) but was not presenting audio (e.g., audio status column 308). In this manner, the example media measurement data controller 212 queries the major/minor channel column 314 at the time of the unidentified media and at a time before the unidentified media to compare the channel information at each time. If the media measurement data controller 212 determines the channel frequency variable at the time of the unidentified data equals the channel frequency variable at the time before the unidentified data, then the example media measurement data controller 212 queries the match column 312 to determine if the time before the unidentified data was matched (e.g., identified as a media stream, a broadcast network, etc.). If the media measurement data controller 212 determines the time before the unidentified data was identified as a specific media, then the media measurement data controller 212 duplicates and time stamps the identified media, updates the unidentified record, and stores it in the example data store 214. Further, the example meter 114 continues to collect live monitoring records as the media presentation device 108 is presenting media to the panelists 104, 106.

In other examples, the media measurement data controller 212 may not perform forward pass operation as the meter 114 is collecting live monitoring records. For example, when the media identifier 204 identifies media data as AOT data, the media measurement data controller 212 stores the AOT data in the data store 214 and does not query the data store 214 for further classification of the AOT data. Instead, however, the example media measurement data controller 212 determines when no additional records are to be received and further performs forward pass and backward pass operation on the records stored in the example data store 214.

When the example data store 214 reaches is maximum capacity of records, the example media measurement data controller 212 is notified and transmits the stored records to the central facility 190 via the network 180. In other examples, the media measurement data controller 212 queries the media interface 230 for determining if the active device is turned off and no video or audio is present, which may indicate there are no additional records to be collected. In this manner the example media measurement data controller 212 and the communication processor 208 transmits the records located in the data store 214 to the central facility 190 via the network communicator 206 and the network 180. For example, if the active device is off, there is no data to gather corresponding to the media, and data collection is complete for a time until the active device is turned back on and the panelists 104, 106 are viewing media.

While an example manner of implementing the meter 114 and media presentation device 108 of FIG. 1 is illustrated in FIGS. 2A 2B, and 2C one or more of the elements, processes and/or devices illustrated in FIGS. 2A 2B, and 2C may be combined, divided, re-arranged, omitted, eliminated and/or implemented in any other way. Further, the example media identifier 204, the example network communicator 206, the example communication processor 208, the example people identifier 210, the example media measurement data controller 212, the example data store 214, the example user interface 216, the example remote controller receiver 218, the example processor 222, the example AV network controller 224, the example bus monitor 228, the example media interface 230, the example AOT identifier 232, the example operating state identifier 234, the example record updater 236, the example comparator 238, the example duplicator 240, the example media data transmitter 242 and/or, more generally, the example media presentation device 108 and meter 114 of FIG. 1 may be implemented by hardware, software, firmware and/or any combination of hardware, software and/or firmware. Thus, for example, any of the example media identifier 204, the example network communicator 206, the example communication processor 208, the example people identifier 210, the example media measurement data controller 212, the example data store 214, the example user interface 216, the example remote controller receiver 218, the example processor 222, the example AV network controller 224, the example bus monitor 228, the example media interface 230, the example AOT identifier 232, the example operating state identifier 234, the example record updater 236, the example comparator 238, the example duplicator 240, the example media data transmitter 242 and/or, more generally, the example media presentation device 108 and meter 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media identifier 204, the example network communicator 206, the example communication processor 208, the example people identifier 210, the example media measurement data controller 212, the example data store 214, the example user interface 216, the example remote controller receiver 218, the example processor 222, the example AV network controller 224, the example bus monitor 228 the example media interface 230, the example AOT identifier 232, the example operating state identifier 234, the example record updater 236, the example comparator 238, the example duplicator 240, and/or the example media data transmitter 242 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media presentation device 108 and meter 114 of FIG. 1 may include one or more elements, processes and/or devices in addition to, or instead of, those illustrated in FIGS. 2A 2B, and 2C and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
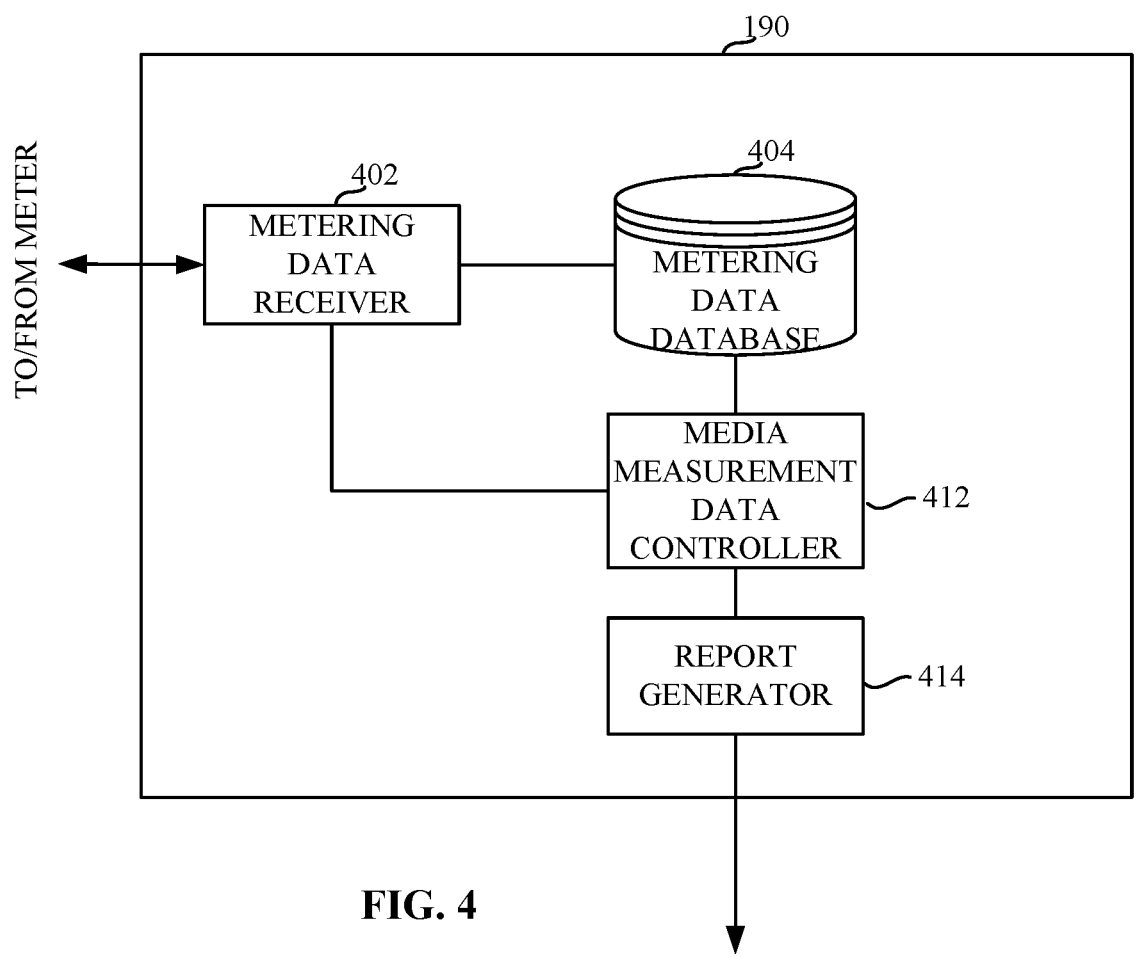
FIG. 4 is a block diagram of the example central facility of FIG. 1.

FIG. 4 is a block diagram illustrating an example implementation of the example central facility 190 for post-processing of the records stored in the example data store 214 (FIG. 2A). The example central facility 190 includes an example metering data receiver 402, an example metering data database 404, and example media measurement data controller 412, and an example report generator 414.

The example metering data receiver 402 of the illustrated example of FIG. 4 receives metering data from the example meter 114 (FIG. 1). For example, the metering data may be the records stored in the example data store 214 (FIG. 2A)

that we were transmitted via the network 180. In other examples, the metering data may include a plurality of records from a plurality of meters 114 installed in multiple households. The example metering data receiver 402 allocates the metering data to appropriate locations in the example metering data database 404 for further analyzing of the records from the meter 114. The example metering data receiver 402 may communicate with meter(s) 114 to acquire metering data when the central facility 190 determines a reports are to be generated for advertisers, program producers, and/or other interested parties.

The example metering data database 404 of the illustrated example of FIG. 4 stores the metering data received by the example metering data receiver 402. The example metering data database 404 may be implemented by any device for storing data such as, for example, flash memory, magnetic media, optical media, etc. Furthermore, the data stored in the example metering data database 404 may be in any data format such as, for example, binary data, comma delimited data, tab delimited data, structured query language (SQL) structures, etc.

The example media measurement data controller 412 of the illustrated example of FIG. 4 analyzes metering data that is stored in example the metering data database 404. In some examples, upon receiving metering data, in response to execution of a command from the metering data receiver 402, and/or other events within the media measurement data controller 412, the media measurement data controller 412 may initiate forward pass and backward pass operation on the records stored in the metering data database 404 to classify any metering data flagged as AOT data or unidentifiable meter data.

For example, the metering data database 404 may store operating state characteristics provided by the data store 214, wherein each record includes corresponding operating state characteristics. When the example media measurement data controller 412 initiates forward pass operation, the example media measurement data controller 412 begins at a first time and determines if the record at the first time is a match "YES" (e.g., the media data has been identified) or a match "NO" (e.g., the media data is classified as AOT data). If the media measurement data controller 412 determines the record is a match "YES," then the media measurement data controller 412 moves forward to analyze the next record. If the media measurement data controller 412 determines the record is not a match "NO," then the media measurement data controller 412 analyzes a record before the current record to determine operating state characteristics and further determine if the previous record includes identified media identifying data that can be duplicated to represent the unidentified media at the current record.

After the example media measurement data controller 412 analyzes each record with the forward pass operation, the example media measurement data controller 412 initiates backward pass operation. For example, the media measurement data controller 412 analyzes the records in the metering data database 404 by analyzing the first record to determine if the first record was identified or unidentified (e.g., querying the match column 312). If the media measurement data controller 412 determines the first record was unidentified or flagged as AOT data, the example media measurement data controller 412 analyzes the record stored directly after the current record to acquire operating state characteristic information as well as if the future record was identified. If the operating state characteristics (e.g., such as the channel information column 314) match in the current record and the future record, then the example media measurement data controller 412 duplicates the future record, time stamps the new duplicated record with a time of the current record and updates the record in the metering data database 404 (e.g., removes the AOT data record and replaces the AOT data record with an identified media record, such as "WFLA" broadcast network).

The example report generator 414 in the illustrated example of FIG. 4 generates media ratings reports to be viewed an analyzed by advertisers, program producers, and/or other interested parties. In some examples, when the media measurement data controller 412 performs forward pass and backward pass operation on the records stored in the metering data database 404, the example report generator 414 is notified by a message, a query, etc., to generate a viewable report of the metering data. Additionally, the example report generator 414 retrieves the records stored in the example metering data database 404 and organizes the data into a format that is understood by a viewer. The example report generator 414 may not include operating state characteristics of the active devices that produced the media data. By performing classification operations (e.g., forward pass and backward pass) at the central facility 190, the overall accuracy of the media ratings increases because more media data is identified and not represented as AOT data.

While an example manner of implementing the central facility 190 of FIG. 1 is illustrated in FIG. 4, one or more of the elements, processes and/or devices illustrated in FIG. 4 may be combined, divided, re-arranged, omitted, eliminated and/or implemented in any other way. Further, the example metering data receiver 402, the example media measurement data controller 412, the example report generator 414, and/or, more generally, the example central facility of FIG. 1 may be implemented by hardware, software, firmware and/or any combination of hardware, software and/or firmware. Thus, for example, any of the example metering data receiver 402, the example media measurement data controller 412, the example report generator 414 and/or, more generally, the example central facility 190 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example metering data receiver 402, the example media measurement data controller 412, and/or the example report generator 414 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 190 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
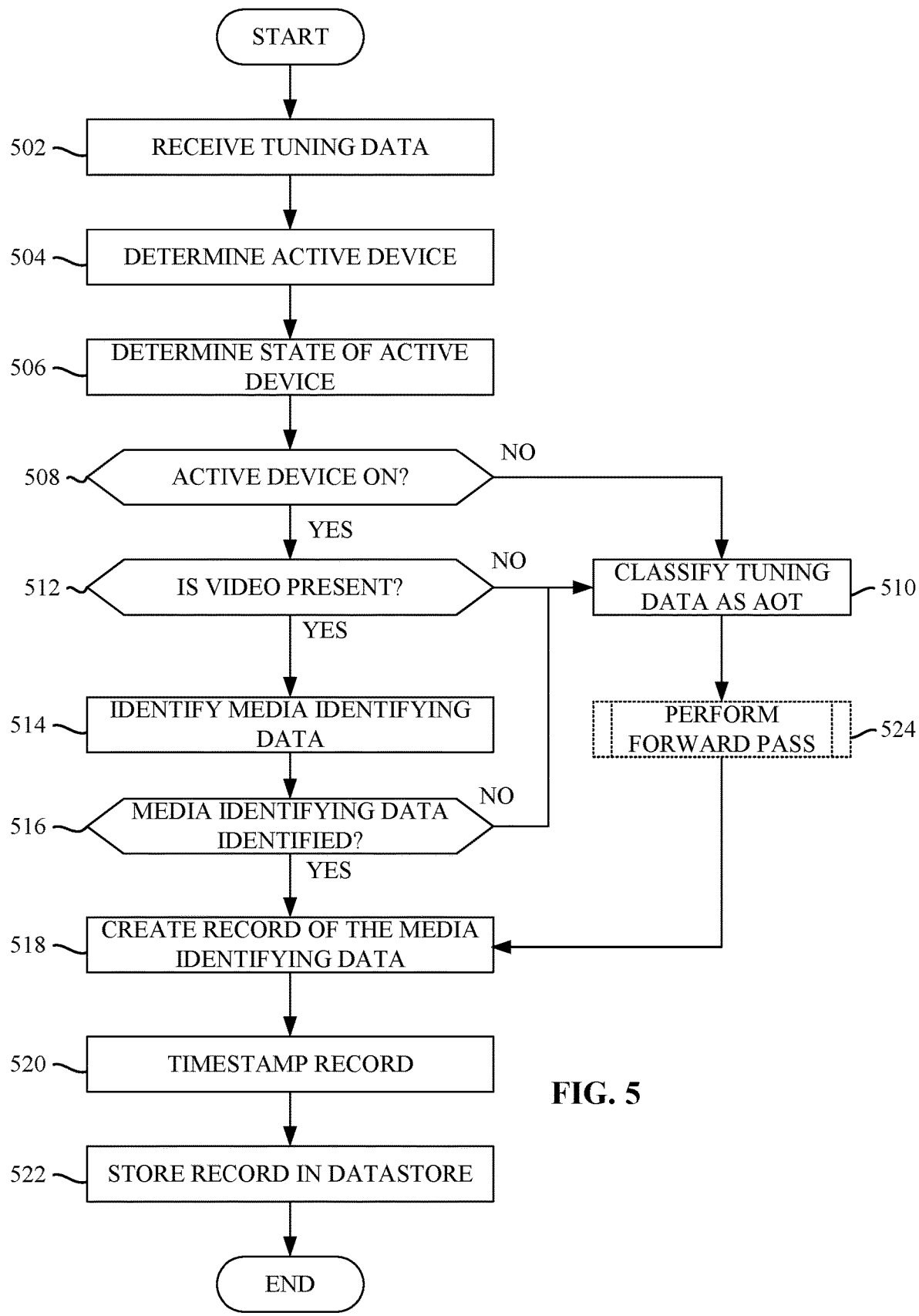
FIG. 5 is a flowchart representative of machine readable instructions which may be executed to implement the example meter of FIG. 1 to collect media data and classify the all-other-tuning data.
Figure 6:
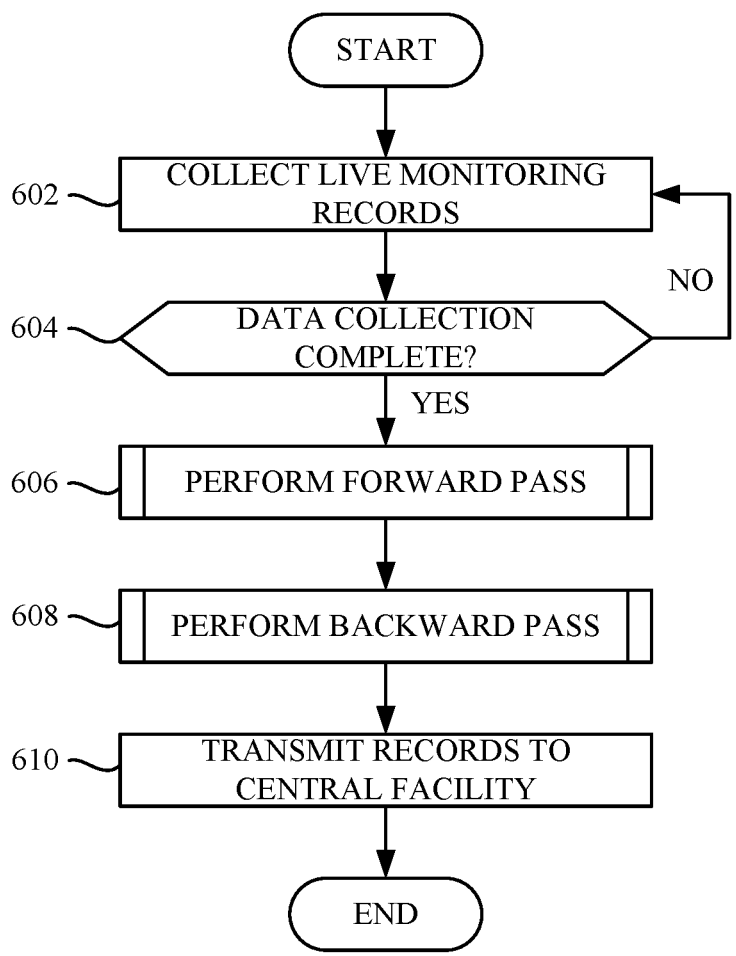
FIG. 6 is a flowchart representative of machine readable instructions which may be executed to implement the example meter and the example media presentation device of FIG. 1 to identify media data.
Figure 7:
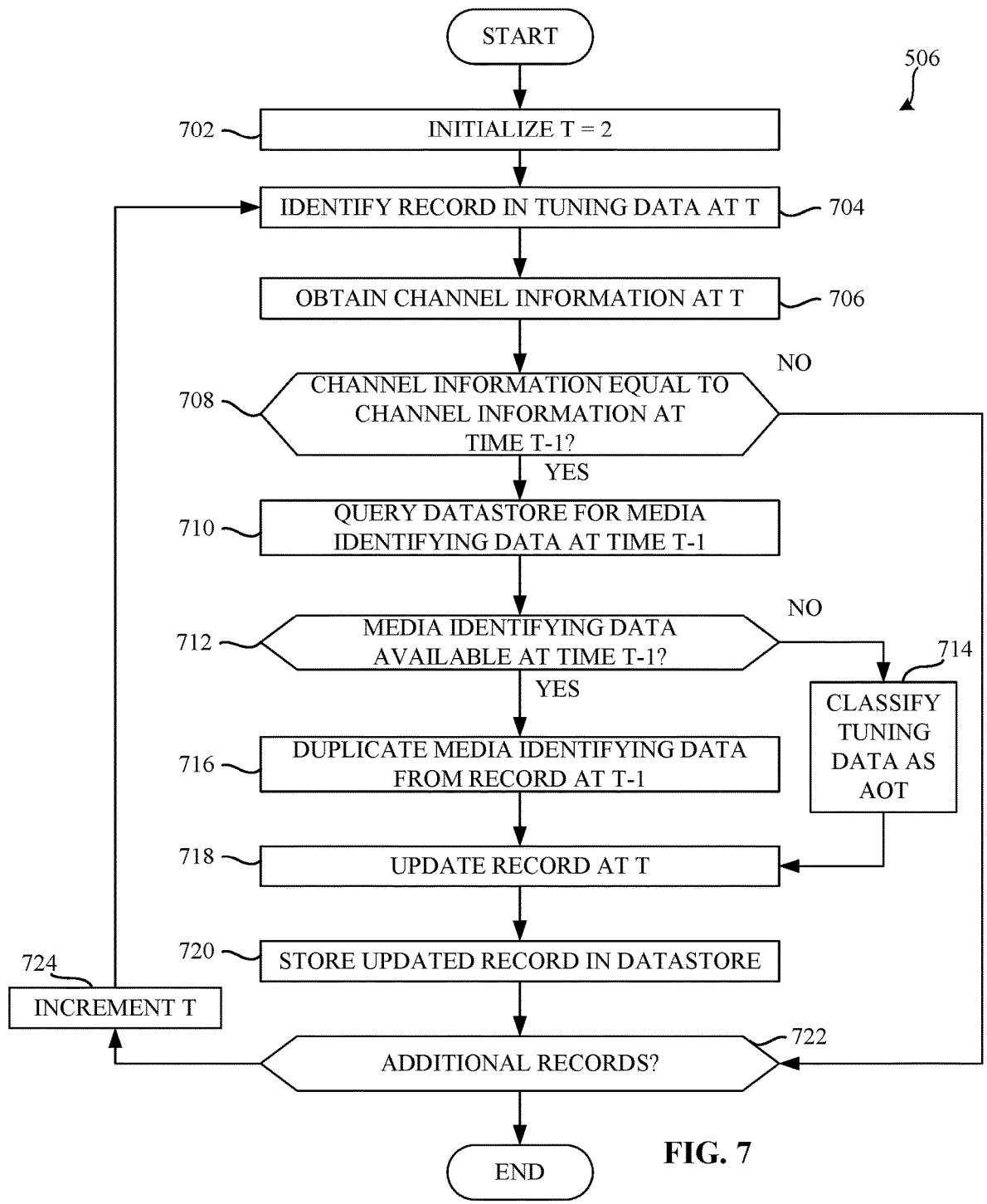
FIG. 7 is a flowchart representative of machine readable instructions which may be executed to implement an example media measurement data controller of FIGS. 2A and 2C to perform a forward pass operation on unidentified media data.

Flowcharts representative of example hardware logic, machine readable instructions, hardware implemented state machines, and/or any combination thereof for implementing the example meter 114 and the example media presentation device 108 of FIG. 1 is shown in FIGS. 5, 6, 7 and/or 8. The machine readable instructions may be one or more executable programs or portion(s) of an executable program for execution by a computer processor such as the processor 1012, 1112 shown in the example processor platform 1000, 1100 discussed below in connection with FIGS. 10 and/or 11. The program may be embodied in software stored on a non-transitory computer readable storage medium such as a CD-ROM, a floppy disk, a hard drive, a DVD, a Blu-ray disk, or a memory associated with the processor 1012, 1112, but the entire program and/or parts thereof could alternatively be executed by a device other than the processor 1012, 1112 and/or embodied in firmware or dedicated hardware. Further, although the example program is described with reference to the flowcharts illustrated in FIGS. 5, 6, 7, and/or 8, many other methods of implementing the example meter 114 and the example media presentation device 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 5, 6, 7, and/or 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 8:
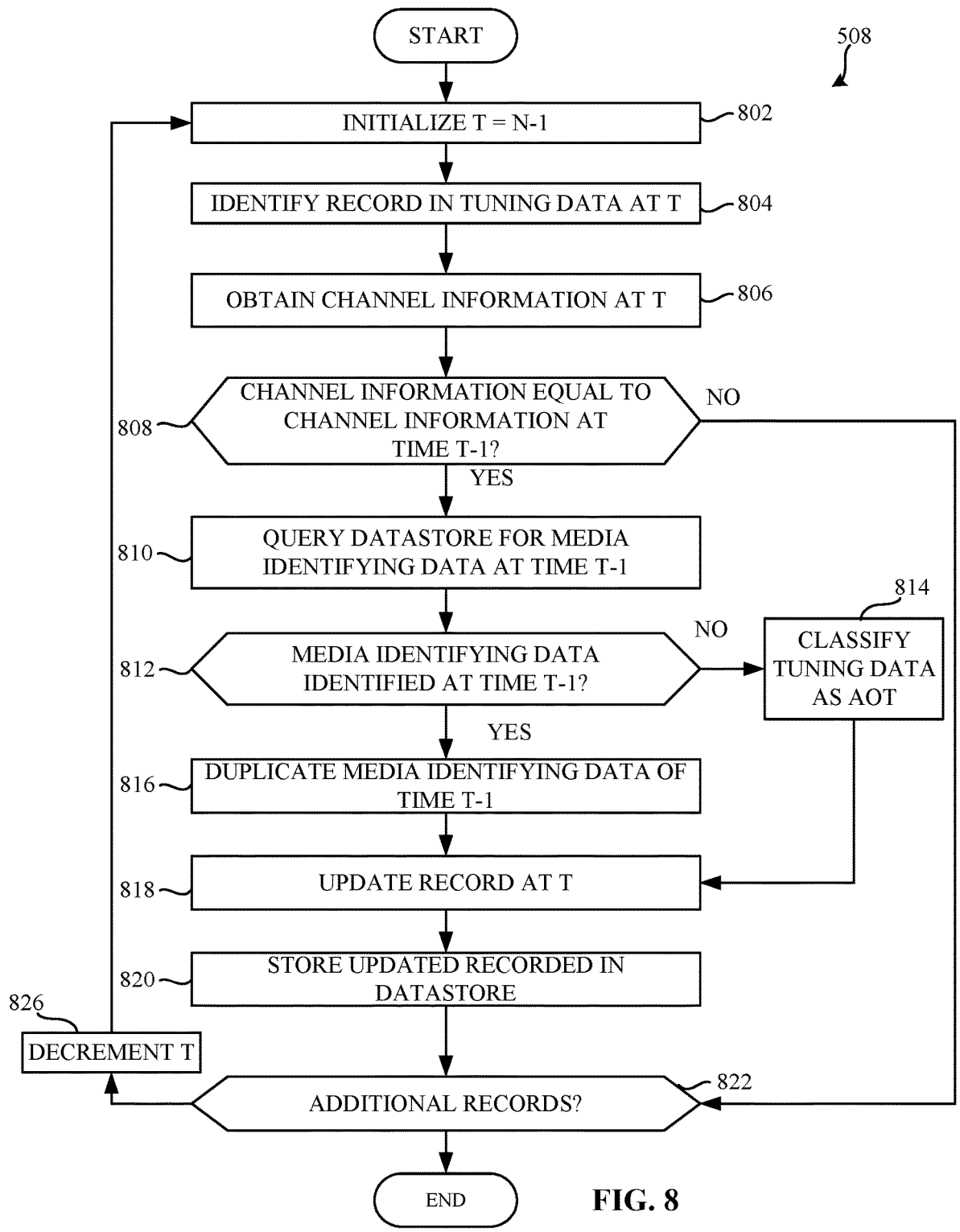
FIG. 8 is a flowchart representative of machine readable instructions which may be executed to implement the example media measurement data controller of FIGS. 2A and 2C to perform a backward pass operation on unidentified media data.

A flowchart representative of example hardware logic, machine readable instructions, hardware implemented state machines, and/or any combination thereof for implementing the central facility 190 of FIG. 1 is shown in FIGS. 7, 8, and/or 9. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 7, 8, and/or 9, many other methods of implementing the example central facility 190 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIGS. 7, 8, and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is a flowchart representing the example meter 114 in communication with the example media presentation device 108 to classify media data. The program of FIG. 5 begins when the example media interface 230 receives tuning data from the AV network controller 224. (Block 502). For example, the AV network controller 224 provides major/minor channel information (e.g., tuning data) to the media interface 230 to store in the example data store 214. Alternatively, the program of FIG. 5 may begin when the example operating state identifier 234 receives tuning data from the example media interface 230.

The example operating state identifier 234 receives information from the example media interface 230 to determine the active device (block 504). For example, the bus monitor 228 monitors communications (e.g., messages) conveyed on the bus 226 and extracts information associated with the commands and/or messages conveyed between the AV network controller 224 and the processor 222, wherein the commands and/or messages may be associated with the operation of any device communicatively coupled to the AV network, including the STB 110.

The example operating state identifier 234 further determines the state of the active device (block 506). For example, the operating state identifier 234 notifies the media interface 230 to query the AV network controller 224 to retrieve information from the bus monitor 228 for determining if the active device is on or off and stores the conclusion in the example data store 214 along with a time stamp to indicate the time at which the active device was on or off. If the example operating state identifier 234 determines the active device is not on (e.g., block 508 returns a result of NO), the example AOT identifier 232 classifies the media data as AOT. (Block 510). For example, if the active device is Off but the meter 114 is still receiving media data, then then media identifier 204 will not be able to match the received audio or video to any audio or video in a remote database.

If the example operating state identifier 234 receives information from the media interface 230 determining the active device is on (e.g., block 508 returns a result of YES), the example operating state identifier 234 determines if video is present. (Block 512). For example, the image sensor 201 may be receiving video signals, pixel intensity values, etc., indicating that the media presentation device 108 is displaying something to the panelists 104, 106. If the operating state identifier 234 determines video is not present (e.g., block 512 returns a result of NO), the example AOT identifier 232 classifies the media data as AOT. (Block 510). For example, if video is not present, the panelists 104, 106 are not viewing any media and a record is stored in the data store 214 as AOT data.

If the example image sensor 201 is receiving variations of light waves indicating video is present (e.g., block 512 returns a result of YES), the example media identifier 204 identifies the media identifying data. (Block 514). For example, the media identifier 204 processes the signals obtained from the media presentation device 108 to detect media and/or source identifying signals (e.g., video watermarks) embedded in portion(s) (e.g., image portions) of the media presented by the media presentation device 108. The example media identifier 204 determines if the media identifying data was identified. (Block 516). For example, the video and/or audio watermark or signature are compared to identifying signals in a remote database and may or may not include a match. In this manner, if the media identifying data does not include a match, the media cannot be identified and the example media identifier 204 classifies the media data as AOT data (Block 510).

The example media measurement data controller 212 further performs forward pass (block 524) on the media data classified as AOT data. For example, the AOT identifier 232 can initiate forward pass operating during live collection of media data by notifying the example comparator 238 to analyze operating state characteristics of the AV device at the time the record is classified as AOT data and at a time prior to when the record was classified as AOT data. The example performance of the forward pass (Block 524) is represented with a dashed line to indicate that forward pass is optional, and might not occur at the time the media data is classified as AOT data but may, instead, occur at a later time and/or be performed by another device (e.g., the server of the central facility 190).

When the example media measurement data controller 212 classifies the media data (e.g., either at the media identifier 204 or during forward pass operation), then the example record updater 236 creates a record of the media identifying data (Block 518), timestamps the record (Block 520), and stores the record in the data store 214 (Block 522). The process of FIG. 5 ends when the record is stored in the example data store 214. (Block 522). The program of FIG. 5 is repeated until tuning data and/or media data is no longer received by the example AOT identifier 232, for example, indicating there is no media to collect and/or process.

The meter-side tuning data classification program of FIG. 5 beings at block 502 when the example meter 114 collects live monitoring records. (Block 602). For example, the image sensor 201 (FIG. 2A) and the audio sensor 202 (FIG. 2A) receive media data from the media presentation device 108 (FIG. 1) in real time and the media identifier 204 (FIG. 2A) identifies the media data and provides the identified media data to the media measurement data controller 212 (FIG. 2A) to create records of the meter data and store the records in the data store 214. In some examples, the media identifier 204 does not identify the media data and the example media measurement data controller 212 stores the unidentified media data as AOT data in the example data store 214. For example, the AOT identifier 232 (FIG. 2C) identifies the unidentified media data as AOT data and provides the AOT data to the example record updater 236 to store as a record in the example data store 214.

When the example record updater 236 creates the records of classified tuning data, the example record updater 236 determines if the data collection is complete. (Block 604). For example, the data store 214 may notify the example record updater 236 informing the record updater 236 that capacity of data has been met and no further records can be stored. In other examples, the operating state identifier 234 (FIG. 2C) may initialize the media interface 230 (FIG. 2A) to retrieve information from the AV network controller 224 (FIG. 2B) corresponding to the active device. For example, if the example operating state identifier 234 and/or the media interface 230 determines the active device is off and no media is presented to the panelists 104, 106 then data collection is complete. If the example operating state identifier 234 and/or the example media interface 230 determines that the data collection is not complete (e.g., block 504 returns a result of NO), the example meter 114 continues to collect live monitoring records (block 602).

When the example meter 114 has completed data collection (e.g., block 604 returns a result of YES), the example meter 114 performs a forward pass on the stored records. (Block 506). For example, the media measurement data controller 212 analyzes records in data store 214 by determining an unidentified record flagged as AOT data and looking at a previous record, not flagged as AOT data and further duplicating that record to store in replace of the AOT data record. An example approach to performing a forward pass is described below in connection with FIG. 7.

The example media measurement data controller 212 performs a backward pass on the records. (Block 608). For example, the media measurement data controller 212 analyzes records in data store 214 by determining an unidentified record flagged as AOT data and looking at a future record, not flagged as AOT data and further duplicating that record to store in place of the AOT data record. An example approach to performing a backward pass is described in further detail below in connection with FIG. 8.

The example communication processor 208 then transmits the records to the central facility 190 (Block 610). For example, the communication processor 208 packages the records of the data store 214 and provides the package of data to the central facility 190 via the network communicator 206 and the network 180. In some examples, the package is a compressed data format (e.g., a .ZIP file). The meter-side classification program ends when the package of records is provided to the central facility 190. (Block 610). The meter-side classification program may be repeated when the example meter 114 receives live monitoring records from the example media presentation device 108. (Block 602).

FIG. 7 is a flowchart representative of machine readable instructions to perform a forward pass on the records of the example data store 214. The forward pass program begins when the example AOT identifier 232 determines a record has been classified as AOT data. The example record updater 236 initializes time T to be equal to the numerical value 2, which is indexed from numerical value 1. (Block 702). For example, time T may represent the first time in the data store 214 when a record was classified as AOT data (e.g., referring to FIGS. 3A and 3B, time 6:30 pm did not have a match, therefore is was classified as AOT). Alternatively, the example record updater 236 initializes time T to be equal to any value or variable indicative of a time when a record was classified as AOT data.

The example record updater 236 identifies the record in the tuning data at time T (block 704). For example, the record updater 236 identifies where the record is stored in the data store 214 at time T. Then, the example comparator 238 (FIG. 2C) obtains channel information at time T (block 706). For example the comparator 238 retrieves information from the data store 214, at 6:30 pm, corresponding to the major/minor channel the media presentation device 108 is tuned to, which is frequency variable 8.1.

The example comparator 238 further determines if the channel information obtained for time T equals the channel information at time T−1 (block 708). For example, time T−1 corresponds to the record stored at a time before time T (e.g., If 6:30 pm is time T, then 6:25 pm is time T−1 in the data store 214 illustrated in FIGS. 3A and 3B). In this example, 5 minute intervals are used, however, any other interval may additionally or alternatively be used. If the example comparator 238 determines the channel information at time T does not equal the channel information at time T−1 (e.g., block 708 returns a result of NO), then the example record updater 236 analyzes additional records. (Block 722). If the example comparator 238 determines the channel information at time T is equal to the channel information at time T−1 (e.g., block 708 returns a result of YES), the example comparator 238 analyzes the data store 214 for the media identifying data at time T−1. (Block 710). For example, the data store 214 includes the broadcast network column 316 corresponding to identified media, such as a WFLA broadcast network.

The example comparator 238 searches the data store 214 for the record at time T−1 (e.g., time 6:25 pm) and determines if media identifying data is available at time T−1 (block 712). If the example comparator 238 determines media identifying data is available at time T−1 (e.g., block 712 returns a result of YES), the example duplicator 240 duplicates the media identifying data from record at time T−1. (Block 716). For example, because the active device was tuned to a channel (e.g., frequency variable 8.1) at time T that was equal to a channel at time T−1, but the media was undeterminable, it can be assumed that the media presented to the panelists 104, 106 at time T was the same media presented at time T−1.

The example record updater 236 updates the record at time T. (Block 718). For example, the record updater 236 receives the duplicated media from the duplicator 240 and replaces the AOT data record with the duplicated media identified data at time T. Further, the example record updater 236 stores the updated record in the data store 214. (Block 720).

If the example comparator 238 determines media identifying data is not available at time T−1 (e.g., block 712 returns a result of NO), then the record at time T is classified as AOT data (block 714) and the record is updated at time T (block 718). When the example record updater 236 has stored the updated record in the data store 214, the example record updater 236 determines if there are additional records in the data store 214 (block 722) that are classified as AOT data. If the example record updater 236 determines there are additional records (e.g., block 722 returns a result of YES), the example record updater 236 increments T and the process returns to block 704. If the example record updater 236 does not determine there are additional records (e.g., block 722 returns a result of NO), the forward pass program ends. The forward pass program may be repeated when the example AOT identifier 232 identifies a record in the data store 214 as AOT data and/or after live monitoring records have been collected.

FIG. 8 is a flowchart representative of machine readable instructions to perform backward pass on the records of the example data store 214. The backward pass program begins after the example media measurement data controller 212 has performed forward pass but can be implemented to occur before the forward pass program. The example record updater 236 initializes time T to be equal to the numerical value N−1, where N is indicative of the number of records to process. (Block 802). For example, time T may represent the last time in the data store 214 when a record was classified as AOT data. The record updater 236 starts with the last time record in the data store 214 because backward pass is an operation that moves back through time in the data store 214 to identify any records marked as AOT and further try to identify those records as associated with a media network.

The example record updater 236 identifies the record in the tuning data at time T (block 804). For example, the record updater 236 identifies where the record is stored in the data store 214 at time T. Then, the example comparator 238 obtains channel information at time T (block 806). For example, in the data store 214, the major/minor channel column 314 is queried for the channel information at time T.

The example comparator 238 further determines if the channel information obtained for time T equals the channel information at time T−1. (Block 808). For example, time T−1 corresponds to the record stored at a time before time T (e.g., If 7:45 pm is time T, then 7:40 pm is time T−1 in the data store 214 illustrated in FIGS. 3A and 3B). If the example comparator 238 determines the channel information does not equal the channel information at time T−1 (e.g., Block 808 returns a result of NO), then the record updater 236 analyzes additional records. (Block 822). If the example comparator 238 determines the channel information is equal to the channel information at time T−1 (e.g., Block 808 returns a result of YES), then the comparator 238 queries the data store 214 for media identifying data at time T−1. (Block 810). For example, the data store 214 includes the broadcast network column 316 corresponding to identified media, such as WFLA broadcast network.

The example comparator 238 searches the data store 214 for the record at time T−1 (e.g., time 7:40 pm) and determines if media identifying data is available at time T−1. (Block 812). For example, if there was a match "YES," then a media type is indicated in the broadcast network column 316. The example duplicator 240 duplicates the media identifying data from record at time T−1. (Block 816). For example, because the active device was tuned to a channel at time T that was equal to a channel at time T−1, but the media was undeterminable, it can be assumed that the media presented to the panelists 104, 106 at time T was the same media presented at time T−1.

The example record updater 236 updates the record at time T. (Block 818). For example, the record updater 236 replaces the AOT data record with the duplicated media identified data at time T. Further, the example record updater 236 stores the updated record in the data store 214. (Block 820).

If the example comparator determines media identifying data is not available at time T−1 (e.g., Block 812 returns a result of NO), then the record at time T is further classified as AOT data (block 814) and the record is updated at time T (block 818). When the example record updater 236 has stored the updated record in the data store 214, the example record updater 236 determines if there are additional records in the data store 214 (block 822) that are classified as AOT data. If the example media measurement data controller 212 determines there are additional records (e.g., block 822 returns a result of YES), the example record updater 236 decrements T (block 826) and the process returns to block 804. If the example record updater 236 does not determine there are additional records (e.g., block 822 returns a result of NO), the backward pass program ends.

Figure 9:
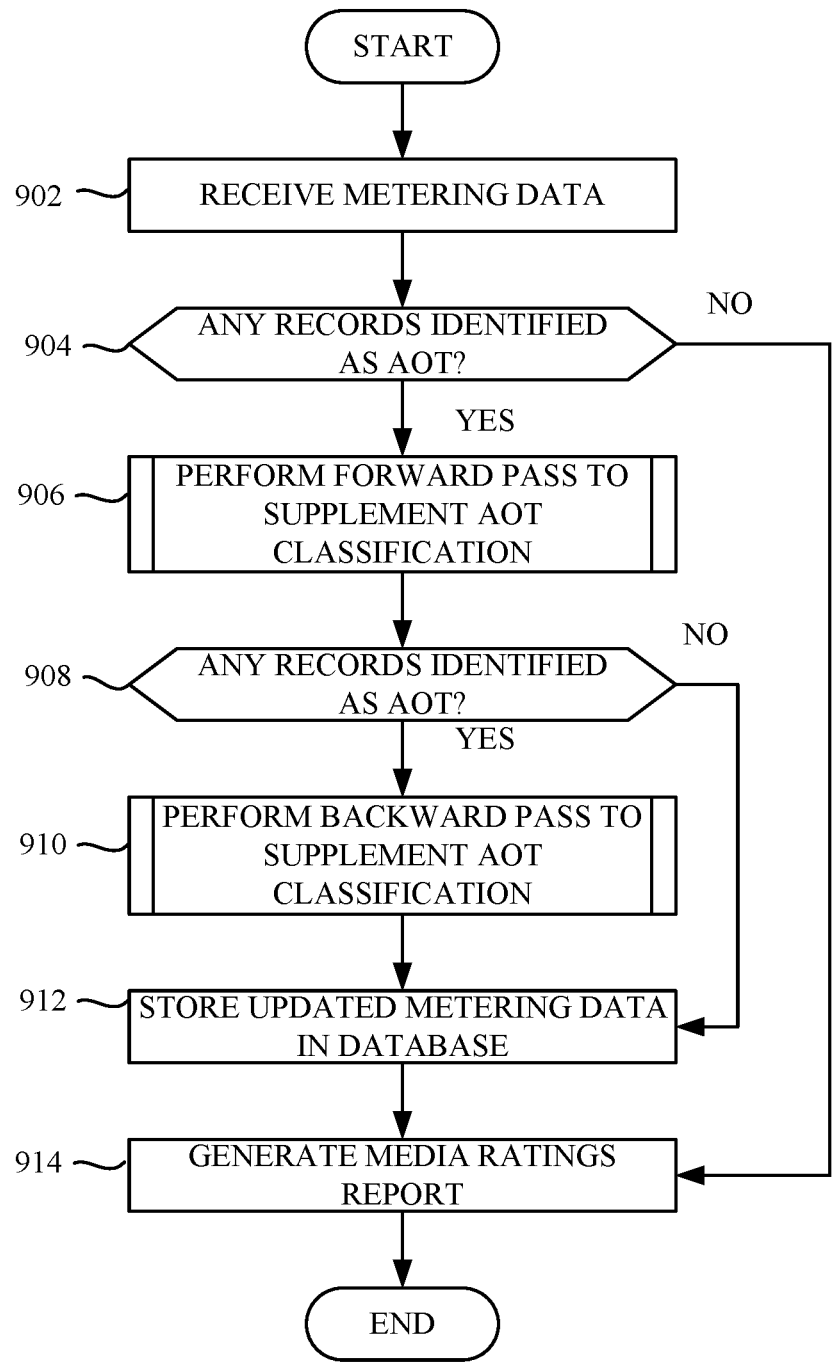
FIG. 9 is a flowchart representative of machine readable instructions which may be executed to implement the example central facility of FIG. 1 to generate a media ratings report.

FIG. 9 is representative of machine readable instructions that are to be executed to implement the central facility 190 illustrated in FIG. 4. The post-processing program begins at block 902 when the example metering data receiver 402 (FIG. 4) receives metering data. For example, when the media measurement data controller 212 (FIG. 2) completes the analyzing of records in the data store 214 (FIG. 2), the communication processor 208 (FIG. 2) notifies the network communicator 206 (FIG. 2) to transmit the records in the data store 214 to the central facility 190.

The example meter data receiver 402 stores the received meter data in the example meter data database 404 (FIG. 4). The example meter data database 404 may notify the example media measurement data controller 412 (FIG. 4) that records are available to be analyzed. In this manner, the example media measurement data controller 412 determines if any records are identified as AOT. (Block 904). For example, the media measurement data controller 412 analyzes the match column of the provided records to determine if any metadata corresponds to "NO," "AOT," "undeterminable," "unidentifiable," etc. If the example media measurement data controller 412 does not determine there are records stored as AOT data (e.g., Block 904 returns a result of NO), the example media measurement data controller 412 notifies the example report generator 414 (FIG. 4) and the example report generator 414 generates media ratings report. (Block 914). For example, the report generator 414 aggregates the metering data into a format that is viewable by an interested party.

If the example media measurement data controller 412 does determine there are records identified as AOT (e.g., Block 904 returns a result of YES), the example media measurement data controller 412 performs forward pass to supplement AOT classification. (Block 906). For example, the media measurement data controller 412 may operate in a similar manner to the media measurement data controller 212 (FIG. 2) and analyze the operating state characteristics along with the records of a current time and a previous time to further retrieve identified media data for duplication purposes. During forward pass operation, if the AOT record can be assumed the same as the identified record from a previous time, then the identified media is duplicated, time stamped with the time of the AOT record, and updated in the example metering data database 404.

After the example media measurement data controller 412 completes forward pass operation on the records in the metering data database 404, the example media measurement data controller 412 determines if there are remaining records identified as AOT. (Block 908). When the example media measurement data controller 412 determines all records have been identified as a media type (e.g., Block 908 returns a result of NO), the example media measurement data controller 412 stores updated metering data in the metering data database 404. (Block 912).

When the media measurement data controller 412 determines there are remaining records identified as AOT (e.g., Block 908 returns a result of YES), the example media measurement data controller 412 performs backward pass to supplement AOT classification. (Block 910). For example, during forward pass operation, a previous record time stamped before the AOT record may not have corresponding identified media and the record remains classified as AOT data. In this manner, the example media measurement data controller 412 tries to identify the AOT record by looking at a future record. The example media measurement data controller 412 analyzes the operating state characteristics along with the records of a current time and a future time to further retrieve identified media data for duplication purposes. During backward pass operation, the AOT record can be assumed to be equal to or the same as the identified record from a future time, then the identified media is duplicated, time stamped with the time of the AOT record, and updated in the example metering data database 404.

When the example media measurement data controller 412 completes backward pass operation, the media measurement data controller 412 stores the updated metering data in the metering data database 404. (Block 912). After the updated metering data is stored, the example media measurement data controller 412 notifies the example report generator 414 that post-processing is complete, and the example report generator 414 initiates the generating of media ratings report. (Block 914). For example, methods and apparatus disclosed herein have performed and exhausted operations to reduce AOT data to generate accurate and insightful media ratings.

Figure 10:
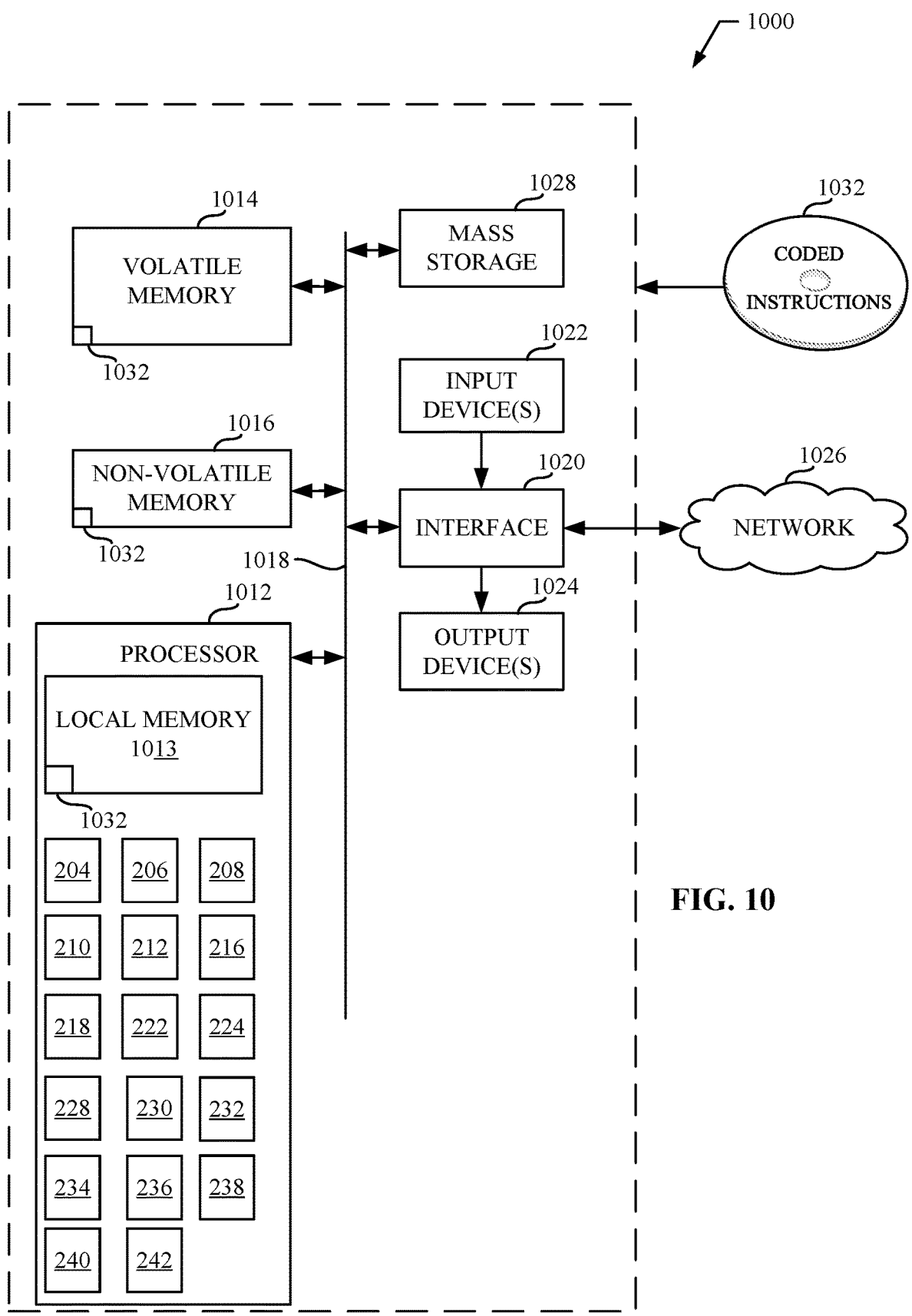
FIG. 10 is a block diagram of an example processing platform structured to execute the instructions of FIGS. 5, 6, 7, and/or 8 to implement the example meter and/or the example media presentation device of FIG. 1.

FIG. 10 is a block diagram of an example processor platform 1000 structured to execute the instructions of FIGS. 5, 6, 7, and 8 to implement the meter 114 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media identifier 204, the example network communicator 206, the example communication processor 208, the example people identifier 210, the example media measurement data controller 212, the example data store 214, the example user interface 216, the example remote controller receiver 218, the example processor 222, the example AV network controller 224, the example bus monitor 228, the example media interface 230, the example AOT identifier 232, the example operating state identifier 234, the example record updater 236, the example comparator 238, the example duplicator 240, and the example media data transmitter 242.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 5-8 may be stored in the mass storage device 1028, in the volatile memory 1014, in the non-volatile memory 1016, and/or on a removable non-transitory computer readable storage medium such as a CD or DVD.

Figure 11:
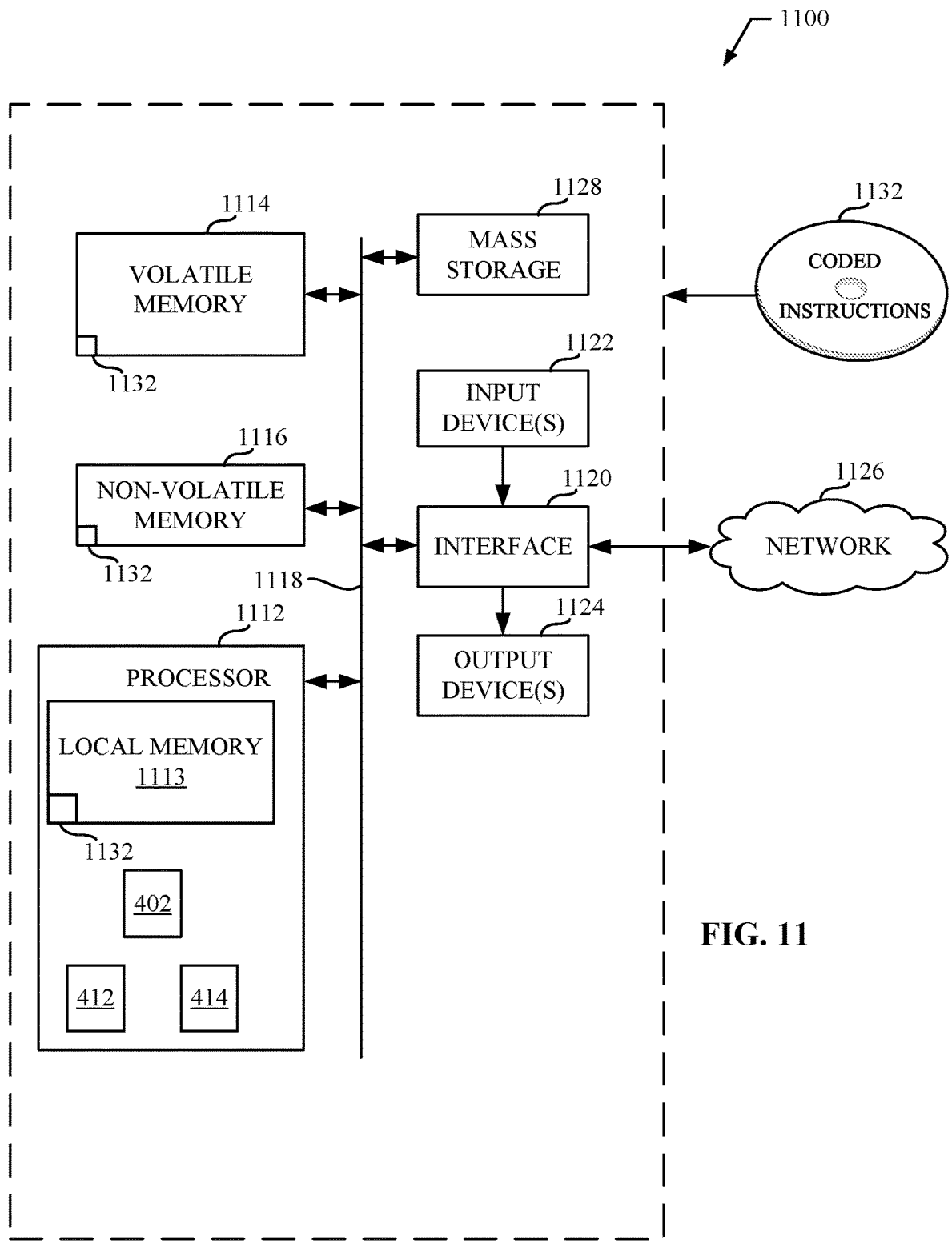
FIG. 11 is a block diagram of an example processing platform structured to execute the instructions of FIGS. 7, 8, and/or 9 to implement the example central facility of FIG. 1.

FIG. 11 is a block diagram of an example processor platform 1100 structured to execute the instructions of FIGS. 7, 8, and/or 9 to implement the central facility 190 of FIG. 1. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example metering data receiver 402, the example media measurement data controller 412, and the example report generator 414.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 9 may be stored in the mass storage device 1128, in the volatile memory 1114, in the non-volatile memory 1116, and/or on a removable non-transitory computer readable storage medium such as a CD or DVD.

Example 1 includes an apparatus for classifying all-other-tuning (AOT), the apparatus comprising a media interface to access first channel information corresponding to a first record at a first time, an operating state identifier to store the channel information corresponding to the first record at the first time in a data store, an AOT identifier to determine the first record is classified as AOT data, a comparator to compare the channel information at the first time with second channel information at a second time, wherein the second channel information at the second time corresponds to a previously classified media record, and a record updater to, when the first channel information matches the second channel information, update the first record with a media identification from the matched media record and store the updated first record in the data store.

Example 2 includes the apparatus of example 1, further including a media identifier to collect live media records from an active device.

Example 3 includes the apparatus of example 2, wherein the media identifier is to classify the media record corresponding to the second time as an identified broadcast network.

Example 4 includes the apparatus of example 2, wherein the operating state identifier is to detect audio codes or compare a signature to classify the media records as identified media or AOT data.

Example 5 includes the apparatus of example 1, further including a duplicator to copy the classified media record at the second time and provide the copy to the record updater.

Example 6 includes the apparatus of example 1, wherein the AOT identifier is to notify the operating state identifier to query the media interface for first channel information before the operating state identifier stores the first channel information in the data store.

Example 7 includes a method for classifying AOT data, the method comprising identifying, by executing an instruction with a processor, a first record corresponding to all-other-tuning (AOT) data with a first time stamp, accessing, by executing an instruction with the processor, channel information corresponding to the first record, comparing, by executing an instruction with the processor, the channel information corresponding to the first record with the channel information corresponding to a second record to determine if the channel information matches, in response to the channel information corresponding to the first record matches the channel information corresponding to the second record, querying, by executing an instruction with the processor, a data store for identified media data of the second record, and duplicating, by executing an instruction with the processor, the identified media data of the second record to replace the AOT data of the first record.

Example 8 includes the method of example 7, further including storing the first record in the data store when the AOT data has been replaced by the identified media data.

Example 9 includes the method of example 7, further including classifying the first record as AOT data if the channel information corresponding to the first record does not match the channel information corresponding to the second record.

Example 10 includes the method of example 7, further including identifying the second record at a time before the first record.

Example 11 includes the method of example 7, further including determining a state of an active device, wherein the active device is presenting unidentifiable media at the first time stamp.

Example 12 includes the method of example 7, further including collecting live media records from an active device.

Example 13 includes the method of example 7, further including detecting audio codes and compare signatures to classify a media record as identified media or AOT data.

Example 14 includes a non-transitory computer readable storage medium comprising instructions that, when executed, cause a processor to at least identify a first record corresponding to all-other-tuning (AOT) data with a first time stamp, access channel information corresponding to the first record, compare the channel information corresponding to the first record with the channel information corresponding to a second record to determine if the channel information matches, query, in response to the channel information corresponding to the first record matches the channel information corresponding to the second record, a data store for identified media data of the second record, duplicate the identified media data of the second record to replace the AOT data of the first record.

Example 15 includes the non-transitory computer readable storage medium of example 14, wherein the instructions, when executed, cause the processor to store the first record in the data store when the AOT data has been replaced by the identified media data.

Example 16 includes the non-transitory computer readable storage medium of example 14, wherein the instructions, when executed, cause the processor to classify the first record as AOT data if the channel information corresponding to the first record does not match the channel information corresponding to the second record.

Example 17 includes the non-transitory computer readable storage medium of example 14, wherein the instructions, when executed, cause the processor to identify the second record at a time before the first record.

Example 18 includes the non-transitory computer readable storage medium of example 14, wherein the instructions, when executed, cause the processor to determine a state of an active device, wherein the active device is presenting unidentifiable media at the first time stamp.

Example 19 includes the non-transitory computer readable storage medium of example 14, wherein the instructions, when executed, cause the processor to collect live media records from an active device.

Example 20 includes the non-transitory computer readable storage medium of example 14, wherein the instructions, when executed, cause the processor to detect audio codes or compare a signature to classify a media record as identified media or AOT data.

Example 21 includes an apparatus for supplementing all-other-tuning (AOT) data classification, the apparatus comprising a record updater to, upon a determination that media data collection is complete, initialize a variable to be equal to a first time corresponding to a first media record classified as AOT data or to be equal to a last time corresponding to a last media record classified as AOT data, an operating state identifier to access a first channel information corresponding to the first media record and last channel information corresponding to the last media record, a comparator to compare the first channel information with a second channel information or a third channel information with the last channel information, wherein the second channel information corresponds to a previously classified media record of the first media record and the third channel information corresponds to a previously classified media record of the last media record, and a duplicator to, in response to the first channel information matching the second channel information, or the last channel information matches the third channel information, create a replica of at least one of the second channel information or the third channel information to store in place of the AOT data in the first media record or the last media record.

Example 22 includes the apparatus of example 21, further including a media data transmitter to transmit media records in a data store to a communication processor when the record updater updates media records.

Example 23 includes the apparatus of example 22, wherein the record updater is to initialize the variable to be equal to all media records classified with AOT data.

Example 24 includes the apparatus of example 23, wherein the initialization of the variable includes at least one of incrementing the variable or decrementing the variable.

Example 25 includes the apparatus of example 21, wherein the record updater is to store the replicated channel information in a data store.

Example 26 includes the apparatus of example 21, further including a data store to store media records and corresponding operating state characteristics with a time stamp.

Example 27 includes the apparatus of example 26, wherein the comparator is to query the data store for at least one of the first channel information, the second channel information, the third channel information, and the last channel information.

Example 28 includes an apparatus for supplementing all-other-tuning (AOT) data, the apparatus comprising a metering data receiver to store media records in a metering data database when a meter provides the media records, a media measurement data controller to perform a forward pass and a backward pass on the media records to identify media records classified as AOT data, and a report generator to generate a media ratings report based on the media records processed by the media measurement data controller.

Example 29 includes the apparatus of example 28, wherein to perform the forward pass, the media measurement data controller is to match and replace first channel information corresponding to a first media record classified as AOT data with second channel information identifying media presented at a time before the first media record.

Example 30 includes the apparatus of example 28, wherein to perform the backward pass, the media measurement data controller is to match and replace first channel information corresponding to a first media record classified as AOT data with second channel information identifying media presented at a time after the first media record.

From the foregoing, it will be appreciated that example methods, apparatus and articles of manufacture have been disclosed that increase accuracy of media ratings, such as television ratings, by identifying data an example meter was not able to identify. The disclosed methods, apparatus and articles of manufacture improve the efficiency of using a computing device by processing media data classified as AOT data while the meter is collecting the media data in real time to reduce a post-processing time after data collection has been completed. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for supplementing all-other-tuning (AOT) data classification, the apparatus comprising:
    a record updater to, upon a determination that media data collection is complete, initialize a variable to be equal to a first time corresponding to a first media record classified as AOT data or to be equal to a last time corresponding to a last media record classified as AOT data;
    an operating state identifier to access a first channel information corresponding to the first media record and last channel information corresponding to the last media record;
    a comparator to compare the first channel information with a second channel information or a third channel information with the last channel information, wherein the second channel information corresponds to a previously classified media record of the first media record and the third channel information corresponds to a previously classified media record of the last media record; and
    a duplicator to, based on the first channel information matching the second channel information, or the last channel information matching the third channel information, create a replica of at least one of the second channel information or the third channel information, wherein the replica of at least one of the second channel information or the third channel information is sent to the record updater to replace the AOT data in the first media record or the last media record.

2. The apparatus of claim 1, further comprising:
    a media data transmitter to transmit media records in a data store to a communication processor when the record updater updates media records.

3. The apparatus of claim 2, wherein the record updater is to initialize the variable to be equal to all media records classified with AOT data.

4. The apparatus of claim 3, wherein the initialization of the variable includes at least one of incrementing the variable or decrementing the variable.

5. The apparatus of claim 1, wherein the record updater is to store the replica of at least one of the second channel information or the third channel information in a data store.

6. The apparatus of claim 1, further comprising:
    a data store to store media records and corresponding operating state characteristics with a time stamp.

7. The apparatus of claim 6, wherein the comparator is to query the data store for at least one of the first channel information, the second channel information, the third channel information, and the last channel information.

8. A non-transitory computer-readable storage medium, having stored thereon program instructions that upon execution by a processor, cause performance of operations comprising:
    initializing, upon a determination that media data collection is complete, a variable to be equal to a first time corresponding to a first media record classified as AOT data or to be equal to a last time corresponding to a last media record classified as AOT data;
    accessing a first channel information corresponding to the first media record and last channel information corresponding to the last media record;
    comparing the first channel information with a second channel information or a third channel information with the last channel information, wherein the second channel information corresponds to a previously classified media record of the first media record and the third channel information corresponds to a previously classified media record of the last media record; and
    creating, after a matching of the first channel information and the second channel information, or after a matching of the last channel information and the third channel information, a replica of at least one of the second channel information or the third channel information, wherein the replica of at least one of the second channel information or the third channel information is sent to replace the AOT data in the first media record or the last media record.

9. The non-transitory computer-readable storage medium of claim 8, the operations further comprising: transmitting media records in a data store to a communication processor when the media records are updated.

10. The non-transitory computer-readable storage medium of claim 9, the operations further comprising:
    initializing the variable to be equal to all media records classified with AOT data.

11. The non-transitory computer-readable storage medium of claim 10, wherein the initialization of the variable includes at least one of incrementing the variable or decrementing the variable.

12. The non-transitory computer-readable storage medium of claim 8, the operations further comprising:
    storing the replica of at least one of the second channel information or the third channel information in a data store.

13. The non-transitory computer-readable storage medium of claim 8, the operations further comprising:
storing media records and corresponding operating state characteristics with a time stamp.

14. The non-transitory computer-readable storage medium of claim 13, the operations further comprising:
querying a data store for at least one of the first channel information, the second channel information, the third channel information, and the last channel information.

15. A system comprising:
at least one memory;
a processor; and
a non-transitory computer-readable storage medium, having stored thereon program instructions that upon execution by the processor, cause performance of operations comprising:
initializing, upon a determination that media data collection is complete, a variable to be equal to a first time corresponding to a first media record classified as AOT data or to be equal to a last time corresponding to a last media record classified as AOT data;
accessing a first channel information corresponding to the first media record and last channel information corresponding to the last media record;
comparing the first channel information with a second channel information or a third channel information with the last channel information, wherein the second channel information corresponds to a previously classified media record of the first media record and the third channel information corresponds to a previously classified media record of the last media record; and
creating, after a matching of the first channel information and the second channel information, or after a matching of the last channel information and the third channel information, a replica of at least one of the second channel information or the third channel information, wherein the replica of at least one of the second channel information or the third channel information is sent to replace the AOT data in the first media record or the last media record.

16. The system of claim 15, wherein the operations further comprise transmitting media records in a data store to a communication processor when the media records are updated.

17. The system of claim 16, wherein the operations further comprise initializing the variable to be equal to all media records classified with AOT data.

18. The system of claim 17, wherein the initialization of the variable includes at least one of incrementing the variable or decrementing the variable.

19. The system of claim 15, wherein the operations further comprise storing the replica of at least one of the second channel information or the third channel information in a data store.

20. The system of claim 15, wherein the operations further comprise storing media records and corresponding operating state characteristics with a time stamp.

* * * * *